(12) United States Patent  (10) Patent No.: US 12,152,999 B2
Chaudhury et al.  (45) Date of Patent: Nov. 26, 2024

(54) LASER BASED INCLUSION DETECTION SYSTEM AND METHODS

(71) Applicant: CORNING INCORPORATED, Corning, NY (US)

(72) Inventors: Souma Chaudhury, Corning, NY (US); Mark Anthony Summa, Painted Post, NY (US); Seungcheol Yang, Horseheads, NY (US); Jiaxiang Zhang, Round Rock, TX (US)

(73) Assignee: Corning Incorporated, Corning, NY (US)

( * ) Notice: Subject to any disclaimer, the term of this patent is extended or adjusted under 35 U.S.C. 154(b) by 264 days.

(21) Appl. No.: 17/783,315

(22) PCT Filed: Dec. 2, 2020

(86) PCT No.: PCT/US2020/062790
§ 371 (c)(1),
(2) Date: Jun. 8, 2022

(87) PCT Pub. No.: WO2021/118838
PCT Pub. Date: Jun. 17, 2021

(65) Prior Publication Data
US 2023/0020684 A1  Jan. 19, 2023

Related U.S. Application Data

(60) Provisional application No. 62/947,800, filed on Dec. 13, 2019.

(51) Int. Cl.
*G01N 21/958* (2006.01)
*G01N 21/88* (2006.01)
(Continued)

(52) U.S. Cl.
CPC ....... *G01N 21/958* (2013.01); *G01N 21/8806* (2013.01); *G02B 21/125* (2013.01);
(Continued)

(58) Field of Classification Search
CPC ............. G01N 21/958; G01N 21/8806; G01N 2021/8822; G01N 2201/06113; G01N 21/896; G02B 21/125; G02B 21/26
See application file for complete search history.

(56) References Cited

U.S. PATENT DOCUMENTS 5,459,330 A    10/1995   Venaille et al.
6,437,357 B1 *  8/2002   Weiss .................. G01N 21/896
                                                              250/559.46
(Continued)

FOREIGN PATENT DOCUMENTS

JP    2005-069989 A    3/2005
JP    2018-112411 A    7/2018
(Continued)

OTHER PUBLICATIONS

International Search Report and Written Opinion of the International Searching Authority; PCT/US2020/062790; dated Mar. 24, 2021; 10 pages; Korean Patent Office.
(Continued)

*Primary Examiner* — Hung V Nguyen
(74) *Attorney, Agent, or Firm* — Ryan T. Hardee; Grant A. Gildehaus

(57) ABSTRACT

Apparatuses and methods are described for detecting inclusions in glass. The apparatuses and methods employ a laser that is configured to project a laser sheet at a first angle from one side of a glass sheet, and a camera configured to capture images from a second angle from another side of the glass sheet. The glass sheet is moved thorough the laser sheet while the camera captures images. One or more processing (Continued)

devices execute image processing algorithms to identify areas of the glass sheet containing inclusions based on the captured images. In some examples, the identified areas of the glass sheet are revisited to confirm they contain inclusions.

14 Claims, 14 Drawing Sheets

(51) Int. Cl.
  *G02B 21/12* (2006.01)
  *G02B 21/26* (2006.01)
(52) U.S. Cl.
  CPC ..... *G02B 21/26* (2013.01); *G01N 2021/8822* (2013.01); *G01N 2201/06113* (2013.01)

(56) References Cited

U.S. PATENT DOCUMENTS

| | | | | |
|---|---|---|---|---|
| 7,554,655 B2* | 6/2009 | Fairley | ............... | G01N 21/9501 356/237.4 |
| 7,567,344 B2* | 7/2009 | LeBlanc | ............... | G01N 21/896 356/239.8 |
| 8,072,593 B2* | 12/2011 | Brittain | ................ | G01N 21/896 356/239.7 |
| 8,242,477 B2* | 8/2012 | Lopatin | ................ | G01N 21/896 250/559.46 |
| 10,866,392 B2* | 12/2020 | Hashimoto | ............... | G06T 5/70 |
| 2007/0115463 A1 | 5/2007 | Dureiko | | |

FOREIGN PATENT DOCUMENTS

| | | |
|---|---|---|
| KR | 10-2012-0129902 A | 11/2012 |
| KR | 10-2013-0020026 A | 2/2013 |
| KR | 10-2015-0053799 A | 5/2015 |
| WO | 2001/018532 A1 | 3/2001 |
| WO | 2015/053712 A1 | 4/2015 |

OTHER PUBLICATIONS

Li et al., "Inspection and Image Analysis of Nickel Sulphide Inclusions in Toughened Glass Panels", 9th International Conference on Control, Automation, Robotics and Vision, 2006, 6 pages.
Zhao et al., "A Method for Detection and Classification of Glass Defects in Low Resolution Images", Sixth International Conference on Image and Graphics, 2011, pp. 642-647.

* cited by examiner

LASER BASED INCLUSION DETECTION SYSTEM AND METHODS

CROSS-REFERENCE TO RELATED APPLICATIONS

This application is a national stage entry of International Patent Application Serial No. PCT/US2020/062790, filed on Dec. 2, 2020, which in turn, claims the benefit of priority under 35 U.S.C. § 119 of U.S. Provisional Application Ser. No. 62/947,800 filed on Dec. 13, 2019, the contents of each of which are relied upon and incorporated herein by reference in their entireties.

BACKGROUND

Field of the Disclosure

The present disclosure relates to the detection of inclusions in glass and, more particularly, to apparatus and methods for detecting inclusions in thin and textured glass.

Background

Glass sheets are used in a variety of applications. For example, they may be used in glass display panels such as in mobile devices, laptops, tablets, computer monitors, and television displays. When produced, however, glass sheets may include defects such as inclusions or surface discontinuities. Some defects, when they appear on the surface of the glass, may be referred to as "bumps." These bumps can be convex features protruding above the surface of surrounding (e.g., polished) glass. In some examples, inclusions can appear within the glass sheets. Glass manufactures inspect glass sheets in an attempt to detect these defects, for example, for quality control purposes or classification purposes. Inclusions in glass can cause functional (e.g., strength) defects or cosmetic (e.g., visual appearance) defects.

In some conventional examples, human glass inspectors attempt to detect inclusions in glass sheets. In this practice, a sheet of glass is illuminated from the edge of the glass (e.g., using dark field illumination) while the glass is tipped and tilted manually in front of a black background by a very well trained inspector wearing a pair of magnifying glasses. In a much time consuming process, the inspector attempts to discriminate scattering centers in the glass volume from a sea of scattering centers caused from rough glass surfaces. For example, for thin glass with textured surfaces, the scattering of light due to the surface texture creates a high density of false positives. In some examples, the inclusions may be small (e.g., down to 10 µm in size), thereby making detection even more challenging. Moreover, the performance between different inspectors can be dramatically different due to training, experience, and eye sight. Even for the same individual, inclusion detection can degrade with time when performing such intense tasks. As such, there are opportunities to improve the detection of defects in glass sheets.

SUMMARY

Features disclosed herein allow for the detection of defects, such as inclusions, in thin and textured glass, such as rolled sheet glass. In some examples, a laser sheet is projected at an oblique angle to a glass sheet. An area scan camera is mounted on the opposite side of the glass sheet, at another oblique angle. The scan camera can take images of the intersection of laser sheet and the glass. The glass traverses through the laser sheet while the camera captures a series of images. Image processing algorithms allow for the detection of suspicious areas of the glass that may contain inclusions from the image data while ignoring noise that can be caused by defects on the surface of the glass. In some examples, the suspicious areas are re-imaged using a high resolution technology to confirm and characterize inclusions in the glass.

Among other advantages, the embodiments can allow for the detection of small inclusions (e.g., <10 µm) in textured glass. In addition, the embodiments can shorten inspection turnaround time and significantly simplify conventional glass inspection processes. Moreover, the embodiments may allow for the detection of inclusions in thin glass (e.g., <~1 mm in thickness), and can suppress surface noise such as blemishes, textures and contaminants, which conventional systems may detect causing false inclusion detections (e.g., false positives). Additionally, the embodiments may allow for a much faster inspection of glass sheets than conventional methods. Others of ordinary skill in the art having the benefit of these disclosures may recognize additional benefits as well.

In some examples, an apparatus comprises a laser configured to project a laser sheet onto a first side of a glass sheet, and a camera configured to capture images of the glass sheet from a second side of the glass sheet, wherein the camera captures the images using darkfield illumination. In some examples, the apparatus comprises a motion stage configured to move the glass sheet through the laser sheet.

In some examples, the apparatus comprises at least one processor configured to determine areas of relatively higher light intensities in the captured images. In some examples, the at least one processor is configured to identify inclusions in the glass sheet based on the areas of relatively higher light intensities in the captured images.

In some examples, the at least one processor is configured to determine areas of relatively higher light intensities in the captured images by identifying, in a first image, a top line of higher light intensity, by identifying, in the first image, a bottom light of higher light intensity, and by identifying, in the first image, a first area of higher light intensity between the top line of higher light intensity and the bottom line of higher light intensity. The at least one processor is also configured to determine an inclusion in the first area based on light intensities of the top line, the bottom line, and the first area.

In some examples, the at least one processor is configured to determine areas of relatively higher light intensities in the captured images by determining a first distance from the first area to the top line, determining a second area in a second image based on the first distance, where the first area overlays the top line of higher light intensity in the second image. The at least one processor is also configured to determine that a first light intensity of the first area in the first image is greater than a second light intensity of the second area in the second image.

In some examples, the at least one processor is configured to determine areas of relatively higher light intensities in the captured images by determining a second distance from the first area to the bottom line, determining a third area in a third image based on the second distance, where the first area overlays the bottom line of higher light intensity in the third image, and determining that the first light intensity of the first area in the first image is greater than a third light intensity of the third area in the third image.

In some examples, the at least one processor is configured to determine areas in the captured images of relatively higher light intensities by determining a first distance from the first area to the top line. The at least one processor is also configured to determine, for each of a first plurality of images of the captured images, a first expected location of the first area in each image based on the first distance. Further, the at least one processor is configured to determine a second distance from the first area to the bottom line. The at least one processor is also configured to determine, for each of a second plurality of images of the captured images, a second expected location of the first area in each image based on the second distance. The at least one processor is configured to determine a light intensity at each first expected location and at each second expected location. Further, the at least one processor is configured to execute a machine learning algorithm to classify the light intensities, and determine the inclusion in the first area based on the classified light intensities.

In some examples, an apparatus comprises a laser configured to project a laser sheet onto a first side of a glass sheet, a first camera configured to capture images of the glass sheet from a second side of the glass sheet, a motion stage configured to move the glass sheet thorough the laser sheet, and a microscopic imaging camera configured to view the glass sheet from the second side of the glass sheet. In some examples the first camera can capture the images using darkfield illumination.

In some examples, an apparatus comprises a laser configured to project a laser sheet onto a first side of a glass sheet, a first camera configured to capture first images of the glass sheet from a second side of the glass sheet, a motion stage configured to move the glass sheet thorough the laser sheet, and a second camera configured to capture second images of the glass sheet from the first side of the glass sheet. In some examples the first camera can capture the images using darkfield illumination, and the second camera can capture the second images using brightfield illumination. In some examples, the apparatus also comprises a diffuse blue light emitting diode configured to provide light to the first side of the glass sheet, where the first camera comprises a blue light blocking filter. In some examples, the laser is a red line laser. In some examples, the first camera and the second camera are configured to capture the first images and the second images, respectively, simultaneously.

In some examples, an apparatus comprises a laser configured to project a laser sheet onto a first side of a glass sheet, and a first camera configured to capture images of the glass sheet from a second side of the glass sheet, wherein the first camera captures the images using darkfield illumination. The apparatus also comprises a motion stage configured to move the glass sheet through the laser sheet. The apparatus further comprises a backlight, such as a brightfield backlight, configured to project light onto the first side of the glass sheet, and a microscope configured to view the second side of the glass sheet.

In some examples, the motion stage is configured to move the glass sheet through the laser sheet by a predetermined distance. In some examples, the predetermined distance is less than (or equal to) a width of the laser sheet (e.g., the laser line thickness).

In some examples, a method by a processing device includes capturing images of a glass sheet. The method may also include identifying, in a first image of the captured images, a top line of higher light intensity, and identifying, in the first image, a bottom light of higher light intensity. The method further includes identifying, in the first image, a first area of higher light intensity between the top line of higher light intensity and the bottom line of higher light intensity. The method also includes determining an inclusion in the first area based on light intensities of the top line, the bottom line, and the first area.

In some examples, the method includes determining a first distance from the first area to the top line, determining a second area in a second image of the captured images based on the first distance, where the first area overlays the top line of higher light intensity in the second image, and determining that a first light intensity of the first area in the first image is greater than a second light intensity of the second area in the second image.

In some examples, the method includes determining a second distance from the first area to the bottom line, determining a third area in a third image based on the second distance, where the first area overlays the bottom line of higher light intensity in the third image, and determining that the first light intensity of the first area in the first image is greater than a third light intensity of the third area in the third image.

In some examples, a method by a processing device includes capturing images of a glass sheet, and identifying, in a first image of the captured images, a top line of higher light intensity, and identifying, in the first image, a bottom light of higher light intensity. The method further includes identifying, in the first image, a first area of higher light intensity between the top line of higher light intensity and the bottom line of higher light intensity. The method also includes determining a first distance from the first area to the top line. Further, the method includes determining, for each of a first plurality of images of the captured images, a first expected location of the first area in each image based on the first distance. The method also includes determining a second distance from the first area to the bottom line. The method further includes determining, for each of a second plurality of images of the captured images, a second expected location of the first area in each image based on the second distance. The method also includes determining a light intensity at each first expected location and at each second expected location. Further, the method includes executing a machine learning algorithm to classify the light intensities, and determining an inclusion in the first area based on the classified light intensities.

In some examples, a non-transitory computer readable medium has instructions stored thereon where the instructions, when executed by at least one processor, cause a computing device to perform operations that include capturing images of a glass sheet and identifying, in a first image of the captured images, a top line of higher light intensity, and identifying, in the first image, a bottom light of higher light intensity. The operations further include identifying, in the first image, a first area of higher light intensity between the top line of higher light intensity and the bottom line of higher light intensity. The operations also include determining an inclusion in the first area based on light intensities of the top line, the bottom line, and the first area.

In some examples, the operations include determining a first distance from the first area to the top line, determining a second area in a second image of the captured images based on the first distance, where the first area overlays the top line of higher light intensity in the second image, and determining that a first light intensity of the first area in the first image is greater than a second light intensity of the second area in the second image.

In some examples, the operations include determining a second distance from the first area to the bottom line, determining a third area in a third image based on the second distance, where the first area overlays the bottom line of higher light intensity in the third image, and determining that the first light intensity of the first area in the first image is greater than a third light intensity of the third area in the third image.

In some examples, a non-transitory computer readable medium has instructions stored thereon where the instructions, when executed by at least one processor, cause a computing device to perform operations that include capturing images of a glass sheet and identifying, in a first image of the captured images, a top line of higher light intensity, and identifying, in the first image, a bottom light of higher light intensity. The operations further include identifying, in the first image, a first area of higher light intensity between the top line of higher light intensity and the bottom line of higher light intensity. The operations also include determining a first distance from the first area to the top line. Further, the operations include determining, for each of a first plurality of images of the captured images, a first expected location of the first area in each image based on the first distance. The operations also include determining a second distance from the first area to the bottom line. The method further includes determining, for each of a second plurality of images of the captured images, a second expected location of the first area in each image based on the second distance. The operations also include determining a light intensity at each first expected location and at each second expected location. Further, the operations include classifying the light intensities based on the execution of a machine learning algorithm, and determining an inclusion in the first area based on the classified light intensities.

BRIEF DESCRIPTION OF DRAWINGS

The above summary and the below detailed description of illustrative embodiments may be read in conjunction with the appended Figures. The Figures show some of the illustrative embodiments discussed herein. As further explained below, the claims are not limited to the illustrative embodiments. For clarity and ease of reading, Figures may omit views of certain features.

DETAILED DESCRIPTION

Figure 1:
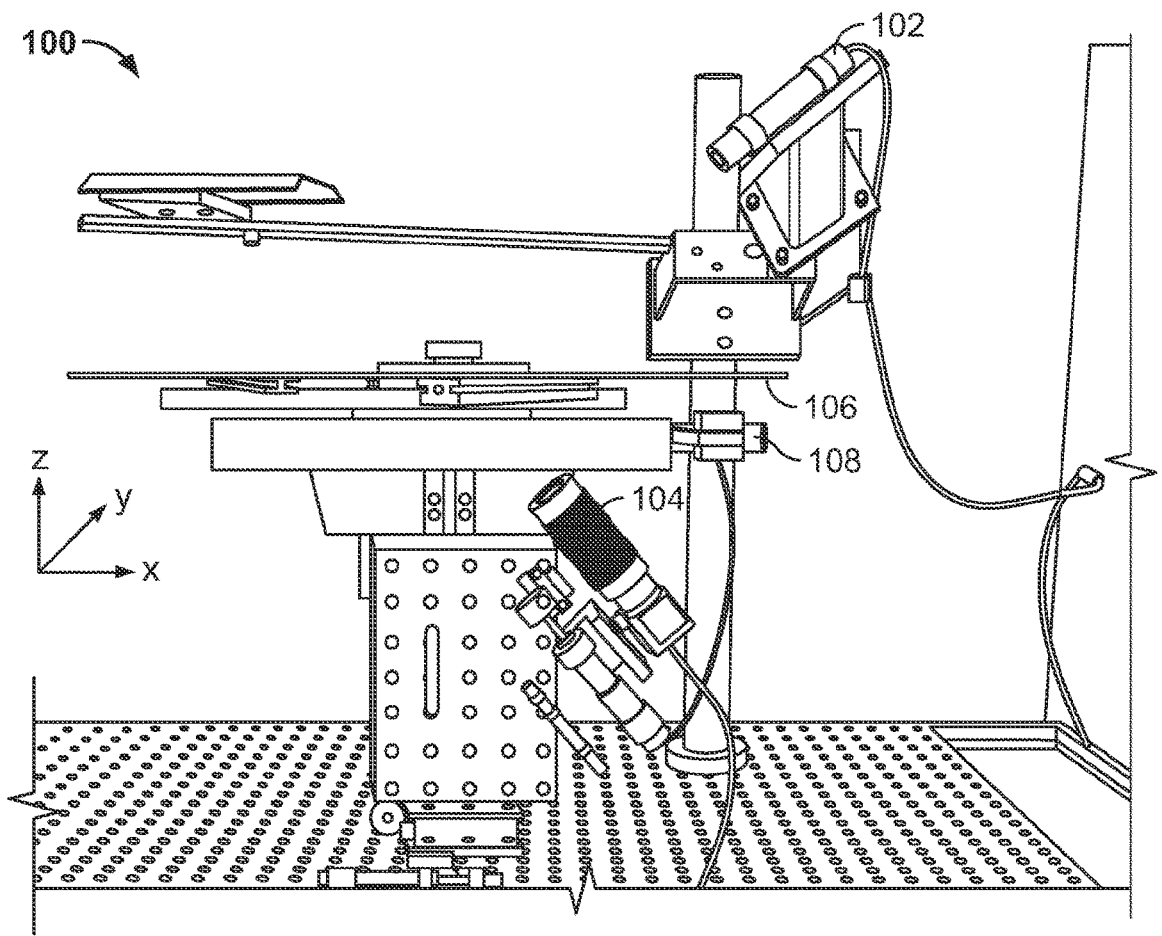
FIG. 1 schematically illustrates an exemplary glass inclusion detection apparatus in accordance with some examples.

The present application discloses illustrative (i.e., example) embodiments. The disclosure is not limited to the illustrative embodiments. Therefore, many implementations of the claims will be different than the illustrative embodiments. Various modifications can be made to the claims without departing from the spirit and scope of the disclosure. The claims are intended to cover implementations with such modifications.

At times, the present application uses directional terms (e.g., front, back, top, bottom, left, right, etc.) to give the reader context when viewing the Figures. The claims, however, are not limited to the orientations shown in the Figures.

Any absolute term (e.g., high, low, etc.) can be understood as disclosing a corresponding relative term (e.g., higher, lower, etc.).

The present disclosure presents apparatus and methods to detect inclusions in glass, such as thin glass with textured surfaces. Inclusions in glass can often cause functional defects (e.g., strength defects) or cosmetic defects (e.g., affecting visual appearance).

Among other advantages, the embodiments can shorten inspection turnaround time and significantly simplify conventional glass inspection processes. In addition, the embodiments may allow for the detection of small inclusions (e.g., <10 μm) in textured glass. Additionally, the embodiments may allow for the detection of inclusions in thin glass (e.g., <~1 mm in thickness), and can suppress surface noise such as blemishes, textures and contaminants, which conventional systems may detect causing false inclusion detections (e.g., false positives). Moreover, the embodiments may allow for a much faster inspection of glass sheets than conventional methods. Others of ordinary skill in the art having the benefit of these disclosures may recognize additional benefits as well.

In some examples, a glass inclusion detection apparatus includes a laser sheet generator (also known as a laser line generator), a camera with a lens, and a motion stage. A laser sheet can be a laser beam expanded along one axis (e.g., a flat laser beam). For example, a laser sheet may be a laser beam with a length and a width, where the length is greater than the width. The laser sheet generator is configured to project a laser sheet to one side (e.g., top) of a glass sheet at an angle (e.g., angle alpha) to the glass sheet. For example, the angle between laser sheet and the normal direction of the glass sheet can be adjustable. The camera is configured to capture images from the other side (e.g., bottom) of the glass sheet, where the camera is configured to capture images at an angle (e.g., angle beta) to the glass sheet. For example, the angle can be measured between the lens's optical axis and a normal direction of the glass sheet. The angle of the laser to the glass sheet (e.g., angle alpha) and the angle of the camera to the glass sheet (e.g., angle beta) can be adjusted for optimal sensitivity in an inspection region of each captured image. In some examples, the angle of the laser to the glass sheet is greater than the angle of the camera to the glass sheet.

In some examples, the camera captures images using darkfield illumination (e.g., a darkfield camera). A darkfield camera may be, for example, a camera used in a darkfield imaging system where the illumination source is not directly captured by the imaging system, either through direct illumination of source to camera, or direct specular reflection of source from the object. Instead, the illumination source is used to illuminate an object. In some examples, as described herein, the illumination source is used to illuminate a glass sheet, and only scattered light from the glass sheet is captured by the camera.

The motion stage is configured to move the glass through the laser sheet. As the motion stage moves the glass sheet through the laser sheet, the camera captures images. The intersection between the glass and the laser sheet can be in the center of the camera's field of view (FOV). If an inclusion is present, the inclusion scatters the light from the laser sheet as the inclusion passes through the laser sheet. The camera captures the scattering of light.

In some examples, the motion stage moves the glass (e.g., in a horizontal direction) through the laser sheet and the camera's FOV. In some examples, the motion stage includes an encoder (e.g., a processor) that is configured to send an electrical pulse to the camera at periodic intervals, such as each time the glass sheet moves a pre-defined distance. In some examples, the predefined distance is smaller than the laser sheet's thickness. Each time when the camera receives the electrical pulse from motion stage encoder, the camera captures an image. The image may be captured at a preset exposure time. In some examples, the image captured by the camera shows an upper bright area (upper bright line area) due to top surface scattering, and a lower bright area (lower bright line area) due to bottom surface scattering. The top surface scattering may be caused by surface imperfections in the glass on the top and bottom surfaces, respectively. The region between the upper and lower bright areas is referred to herein as the inspection region of interest (ROI). The images captured can be saved to memory, such as a hard drive, as image data.

In some examples, the glass sheet is wider than the laser sheet. To inspect additional areas of the glass, the motion stage can move the glass laterally a distance, and then move the glass sheet horizontally through the laser sheet. In this manner, glass sheets with various widths can be inspected.

Once images are captured, a processing device, such as a processor, a digital signal processor (DSP), a computer, a server, or the like can execute an image processing algorithm to detect potential inclusions in the image data. As the glass traversing through the laser sheet, if there is an inclusion that intersects the laser sheet, the inclusion will scatter light. The inclusion can appear as a bright spot in the inspection ROI area of the image. The processing device can detect these bright areas in the images. If there is a large enough surface particle or surface blemish, it too can be illuminated by surface scatterings (e.g., light scattered by surface imperfections). In some examples, these surface particles can also cause a relatively bright scatter signal (e.g., bright area) to appear in the inspection ROI area of the image. These would be false detections (also known as "surface noise"), as they are due to glass surface imperfections, not inclusions within the glass. A large portion of detections can be false detections because surface blemishes can be orders of magnitude larger than real inclusions.

The processing device can filter out false detections based on executing one or more filtering algorithms. The filtering algorithms may determine images where the bright spots should appear in the top or bottom surface scatterings and determine whether the bright spots are more intense in the ROI of the original image or in the top or bottom surface scatterings of the determined images.

For example, assume that for a given image a bright spot is detected in the image's ROI at an image coordinate defined by $(C\_n, R\_n)$, where C represents an image column and R represents an image row. A static model may be employed whereby the processing device computes integers p and q based on the bright spot's distance to surface scatterings (top and bottom surface scatterings). At image $n+p$, and at image $n-q$, the scattering source of the bright spot is expected to overlay with the top surface scattering and the bottom surface scattering, respectively. The expected image coordinate $(C\_{n+p}, R\_{n+p})$, representing the coordinate in image $n+p$ where the bright spot is expected, is also computed. At image $n-q$, the scattering source of the bright spot is expected to overlay with bottom surface scattering. The expected image coordinate $(C\_{n-q}, R\_{n-q})$, representing the coordinate in image $n-p$ where the bright spot is expected, is also computed.

An intensity of the bright spot in each of the three images (e.g., image n, image $n+p$, and image $n-q$) is determined. For example, a first intensity is determined based on the bright spot at coordinate (C_n, R_n) in the original image, image n. A second intensity is determined based on the expected coordinate (C_n+p, R_n+p) in image n+p, and a third intensity is determined based on the expected coordinate (C_n−q, R_n−q) in image n−q.

In some examples, if the first intensity (representing the bright spot at coordinate (C_n, R_n) in the ROI of image n) is greater than the second intensity and the third intensity, the bright spot is determined to be caused by an inclusion (e.g., inclusion is detected). In some examples, the bright spot is determined to be caused by an inclusion when the first intensity is greater than the second intensity by at least a first threshold (e.g., first intensity>(second intensity+first threshold)), and the first intensity is greater than the third intensity by at least a second threshold (e.g., first intensity> (third intensity+second threshold)). In some examples, the first threshold and the second threshold are the same.

As another example, a dynamic model may be employed where a sequence of integers is generated [n−q−m, n−q−m+1 . . . , n+p+m], and where m is a pre-determined integer employed as a tuning parameter. The processing device computes expected coordinates (C_n−q−m, R_n−q−m), (C_n−q−m+1, R_n−q−m+1), (C_n+p+m, R_n+p+m) of the scattering source in each of the images [n−q−m, n−q−m+1 . . . , n+p+m]. The processing device may then generate an intensity trace array where each element each element represents an intensity at (C_i, R_i) in image i, for i in [n−q−m, n−q−m+1 . . . , n+p+m]. The intensity trace array may be, in some examples, a one-dimensional array of size (p+q+2*m+1).

The processing device may then employ a machine learning algorithm, such as a supervised classification algorithm (e.g., based on Support Vector Machine, neuro networks, or deep learning-based methods), to classify the intensity trace array as an inclusion or surface noise. The machine learning algorithm may be trained on supervised data identifying light scattering caused from inclusions and light scattering caused from surface imperfections.

In some examples, the static model and the dynamic model may be both employed to increase the suppression of surface related defects.

In some examples, the glass may be submersed in a liquid, such as water, to suppress or reduce surface noise. This option is beneficially for glass with heavier texture. The liquid can partially match the refraction index at the glass surfaces to further reduce surface noise. Because, in some examples, surface scattering, such as top and bottom surface scattering, is relied upon to locate inclusions, an exact match of liquid and glass refraction indexes is avoided. In addition to the surface scattering suppression, light rays bend less at the glass surfaces. As such, surface scattering may be separated further apart and yield a wider inspection ROI.

In some examples, after surface noise filtering, the inclusions may be revisited through one of many methods.

Microscope Revisit

In one example, a high resolution microscope may be employed to revisit each identified inclusion. The high resolution microscope allows for a more precise location of the inclusion within the glass. For example, a field of view of the higher resolution microscope is moved to an inclusion's location based on the inclusion's coordinates. The high resolution microscope is positioned such that the inclusion appears near the center of its field of view, where the microscope's optical axis is orthogonal to the glass. A brightfield backlight is positioned on the opposite side of the glass. Under the backlight illumination, the high resolution microscope steps through various adjustments so that its depth of field (DOF) moves from the bottom surface of the glass to the top surface of the glass (or top surface to bottom surface of the glass) while images are captured by a camera. The images may be stored to memory.

Once captured, the processing device may determine images in which the surfaces are in best focus (e.g., by executing image processing algorithms), and may focus on any bright spots (due to the brightfield backlight) between the two surfaces. If any bright spots between the two surfaces are detected, the bright spot is determined to be caused by the inclusion. The inclusion's position may be recorded. The inclusion type can be classified using machine learning models, such as deep learning-based algorithms, and the inclusion's size can be measured from the image. If no bright spot is detected between the two surfaces, it is determined that the bright spot was instead caused by surface noise.

Laser Dark Field Aided Microscope Revisit

In another example, after surface noise filtering, a laser dark field is employed to revisit the inclusions. The laser is turned on, and the glass is moved to a position such that the inclusion is scattering laser in the camera's view. The high resolution microscope is positioned such that its field of view is focused on the glass from an opposite side of the glass than the side the laser is projecting a laser sheet onto the glass. The microscope is then focused on the inclusion based on scattering (e.g., until the scattering is most in focus). The laser is then turned off, and a brightfield backlight is turned on. The brightfield backlight projects light onto the glass from the same side that the laser was projecting the laser sheet onto the glass. The inclusion is then detected with the microscope as described above.

In some examples, such as where glass sheets (individual or continuous) are being transported on linear conveyors (e.g., along an x-axis), the embodiments can be adapted to provide full inspection (e.g., 100%) of the glass sheets. For example, an array of cameras and lasers may be positioned along a y-axis to cover the entire width of the glass, thereby inspecting all of the glass along the x-axis as the glass is moved by the motion stage.

In some examples, the glass inclusion detection apparatus may include a second camera. The second camera may be directed to the same surface of the glass which the laser directs the laser sheet to. The second camera may be angled towards the glass at the same angle as the first camera is angled to the glass (e.g., beta) from the opposite side of the glass. The first and second cameras may be calibrated to image the same region of the glass (although from opposite sides of the glass). The inclusions may be determined from the images captured from the second camera as described above for the first camera. The results may then be compared. For example, inclusions determined in images by both cameras may be identified, whereas inclusions determined in an image by just one of the cameras may be discarded (e.g., ignored).

In some examples, using solvents with varying degrees of leaving residue (e.g., high-purity IPA, low-purity IPA, glass cleaner, or surface sprays) can be used to modify (e.g., increase or reduce) surface scatter amplitude and/or improve surface scatter uniformity. Selecting and apply the appropriate surface prep material prior to inclusion detection allows this technique to work on a wide range of surface textures.

In some examples, glass includes inclusions that are oriented in the same plane as the glass sheet. For example, 2D specular reflective inclusions, which can include metallic crystals as small as 5 μm, can be oriented in the glass in such a manner. To increase the detection of these types of inclusions, several methods are proposed.

Diffuse Coaxial Reflective Brightfield (BF)

In one example, an optical system including a lens and a coaxial light incorporating a blue diffuse light emitting diode (LED) is added to the glass inclusion detection apparatus described above. The lens may be a 1× telecentric lens with a variable aperture (e.g., a depth of field 0.5-1.5 mm). The blue diffuse LED (e.g., a diffuse coaxial light emitting diode at wavelength 1) is employed for brightfield while a red laser (e.g., a line laser at wavelength 2) is used for darkfield. The darkfield camera has a blue-blocking filter, which allows for the scanning of darkfield and brightfield simultaneously without the LED interfering with the darkfield measurement. The diffuse blue LED provides a much more uniform reflection signal from the textured glass surface (e.g., greyfield). As such, highly reflective localized features such as metallic crystals provide a significantly higher reflective signal than the surface with good contrast and visibility.

The darkfield laser line is employed during brightfield imaging while the glass is scanned in steps (e.g. the same scan used for darkfield), allowing for the differentiation between reflective events as either surface noise or inclusions. The brightfield image is used to identify and track reflective events between the laser lines (inclusion candidates or potential inclusions). The signal is tracked (e.g., recorded) as it approaches and goes though both the top surface and bottom surface intercepts of the glass with the laser sheet. If the signal is reflecting from a metallic inclusion, the reflection signal will not significantly change (e.g., become significantly brighter or dimmer) at these intercepts. In addition, the reflected signal will tend to not be significantly brighter than the adjacent laser line surface signal. In contrast, if the signal is reflecting from a surface particle, the reflection signal will get significantly stronger at the top or bottom surface laser intercept points depending on which surface of the glass the particle is located.

Diffuse Coaxial Reflective Brightfield (BF) w/Extended Depth of Field

In some examples, the Scheimpflug principle is applied to the optical system. This method extends the depth of field of the system and allows for in focus imaging of these metallic crystals regardless of their depth in the glass. For example, an image plane of the system is tilted in the direction of the scan where the top surface laser line is at one end of the image plane and the bottom surface of laser line is at the other end of the image plane. For a glass thickness of 1 mm and laser angle of 45 degrees, one example is a tilt of the image plane of 1 mm depth over about a 0.53 mm width between the top and bottom surface laser lines. This results in a tilt of about a 62 degree angle. As the glass is scanned, any metallic defect will be scanned through this tilted image plane. When the defect intersects with the image plane, the defect will be in sharp focus via the microscope. This apparatus and method may provide several benefits including allowing for an increased depth of field, thereby allowing the scanning of thicker glass. In addition, image quality and contrast may be improved since defects appear in sharper focus. Moreover, because the image plane is tilted between the top and bottom surfaces of the glass, and because where within the field of view of the microscope where the defect is in best focus can be identified, a depth of the inclusion can be estimated.

Chromatic Confocal Imager

In this example, a chromatic confocal imaging system images reflective inclusions in textured glass over a large depth of field (e.g., 3 mm). The system captures sharp focused images of defects regardless of their depth. In some examples, the chromatic confocal image is added to the glass inclusion detection apparatus described above to simultaneously scan glass for all inclusion types (e.g., the Chromatic Confocal imaging can be used to identify specular reflective inclusions, while the glass inclusion detection apparatus can be used to detect other inclusions).

Chromatic Confocal Sensor with Surface Depth Measurement System

In this example, the chromatic confocal sensor detects reflective events and provides depth measurements of the events. In this example, the depth of the defects is directly measured. In some examples, the chromatic confocal sensor with surface depth measurement system is added to the glass inclusion detection apparatus described above to simultaneously scan glass for all inclusion types (e.g., the chromatic confocal sensor with surface depth measurement system can be used to identify specular reflective inclusions, while the glass inclusion detection apparatus can be used to detect other inclusions).

Referring to FIG. 1, glass inclusion detection apparatus 100 includes a laser 102, a camera 104, and a motion stage 108 supporting a glass sheet 106. The laser 102 is operable to provide a laser sheet to portions of a first side of glass sheet 106. The laser sheet may have a wavelength in the range between violet and infrared, for example. The laser sheet can cover, for example, a width of the glass sheet 106. The laser 102 can provide the laser sheet at an angle (e.g., alpha) normal to the first side of the glass sheet, and the angle is adjustable.

Camera 104 is operable to capture images from a second side of the glass sheet 106. Camera 104 may be, for example, a darkfield camera. Camera 104 can be configured to capture images at an angle (e.g., beta) between the camera's 104 optical axis and a normal direction of the glass sheet 106. In some examples, laser 102 provides the laser sheet from the first side of the glass sheet 106 at an angle that is greater than the angle at which camera 104 captures images from the second side of the glass sheet 106 (e.g., angle alpha is greater than angle beta).

The motion stage 108 is operable to move the glass sheet 106 laterally in the x direction (e.g., as indicated by the key in the figure) through the laser sheet as well as through the camera's field of view. In some examples, the motion stage 108 is operable to move the glass sheet 106 in the y direction. For example, the motion stage 108 can move the glass sheet 106 laterally along the x direction. When the end of the glass sheet 106 is reached, the motion stage 108 can move the glass sheet 106 along the y direction, and then begin moving the glass sheet 106 along the x direction again. In this manner, the laser 102 can cover the entire area of the glass sheet 106.

In some examples, the motion stage 108 moves the glass sheet a predetermined distance along the x direction. The camera 104 then captures an image, and the motion stage 108 again moves the glass sheet a predetermined distance along the x direction. For example, the motion stage 108 may include an encoder that sends an electrical signal (e.g., pulse) to the camera 104 each time after the motion stage 108 moves the glass sheet 106 a predefined distance. When the camera receives the electrical signal from the motion stage 108 encoder, camera 104 captures an image at a preset exposure time. In some examples, the predefined distance is smaller than the laser line's thickness (e.g., width of the laser sheet).

Figure 2:
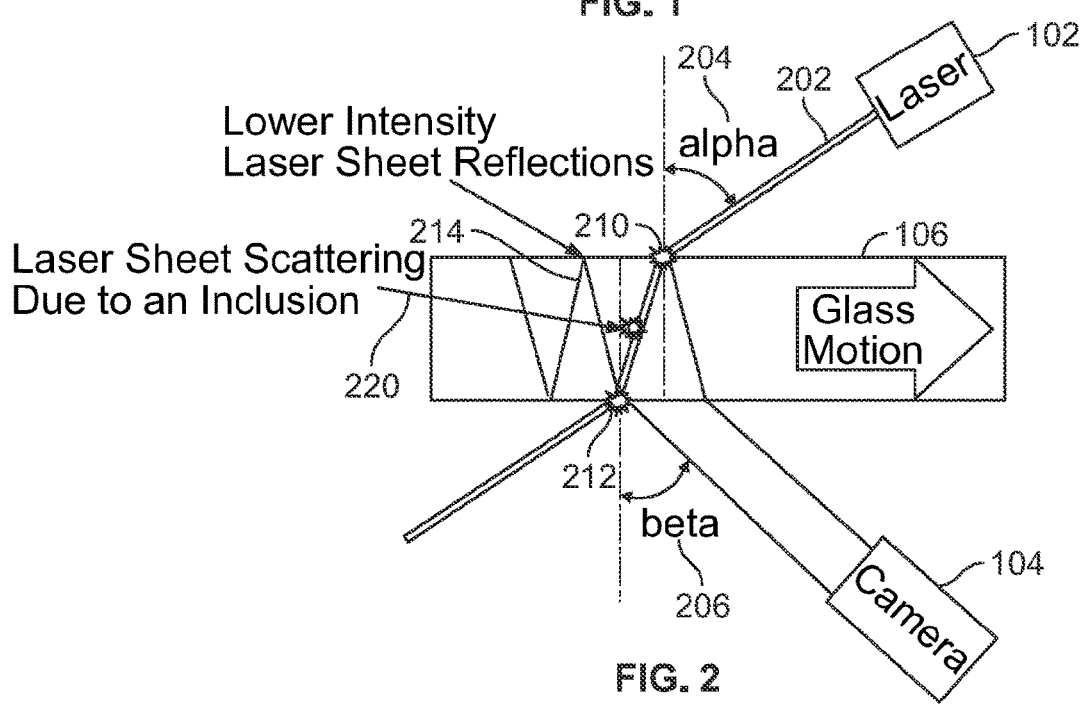
FIG. 2 is a block diagram of the detection of inclusions by an exemplary glass inclusion detection apparatus in accordance with some examples.

FIG. 2 illustrates a block diagram of the glass inclusion detection apparatus 100. As illustrated, laser 102 provides laser sheet 202 at an angle alpha 204 to a normal direction of the glass 106. Similarly, camera 104 has an optical axis at an angle beta to a normal direction of the glass sheet 106. The laser 102 and the camera 104 are on opposite sides of the glass sheet 106. As the motion stage (not shown in this figure) moves the glass sheet 106 along, inclusion 220 will eventually intersect laser sheet 202. In addition, inclusion 220 moves across laser sheet 202, it moves "down" the field of view of camera 104.

When inclusion 220 intersects laser sheet 202, the laser sheet 202 scatters. Camera 104 can capture an image showing the laser sheet 202 scattering. Laser sheet 202 may also scatter when it intersects top surface defects 210 (top surface scattering) or bottom surface defects 212 (bottom surface scattering). Camera 104 may capture images showing this top surface scattering and bottom surface scattering as well. FIG. 2 also illustrates lower intensity laser sheet reflections 214, which indicate laser sheet 202 reflections of the inside portions of the top and bottom surface layers of glass sheet 106.

Figure 3:
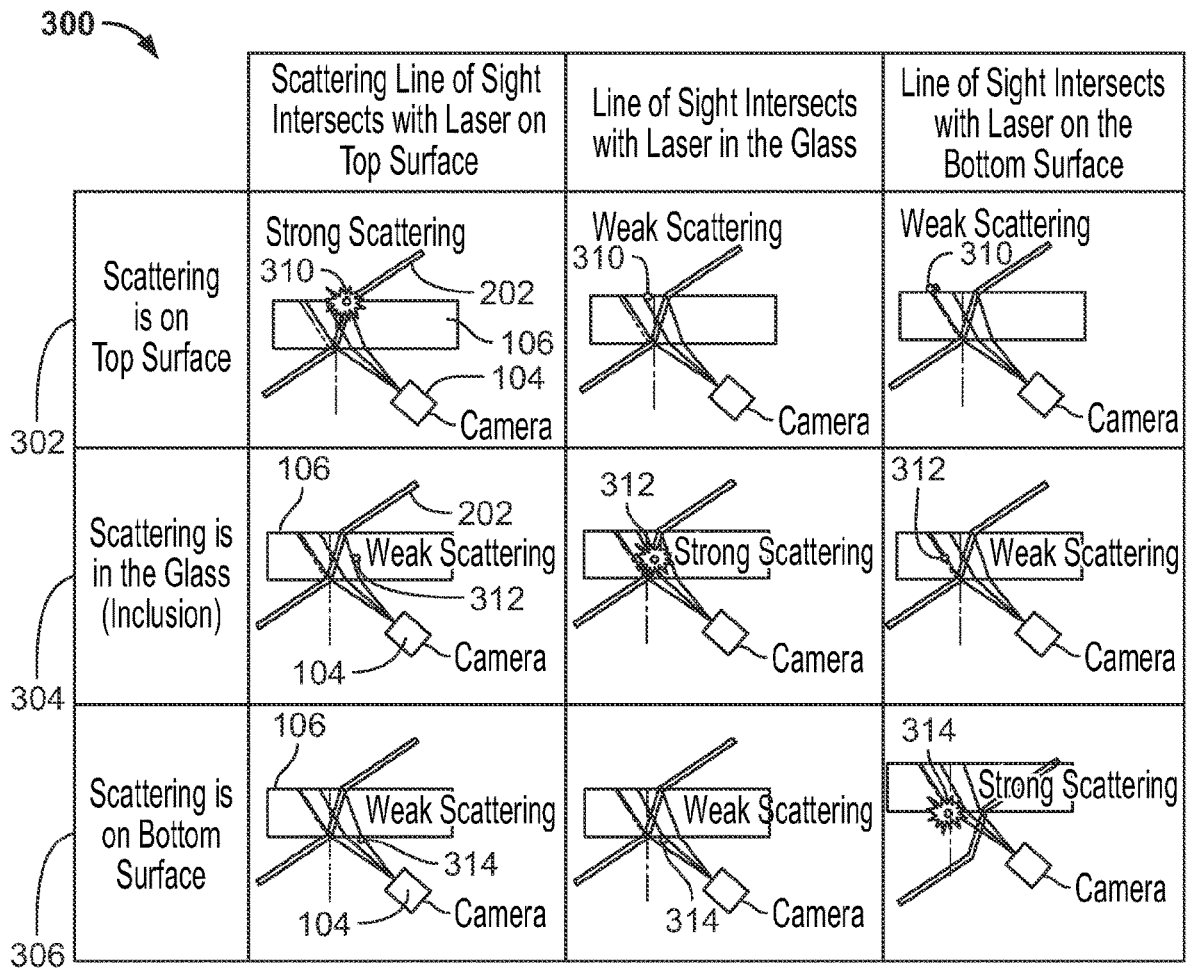
FIG. 3 illustrates light scattering based on locations of inclusions as they pass through a laser sheet as detected by the glass inclusion detection apparatus of FIG. 2.

FIG. 3 illustrates a relative amount of scattering when the laser sheet 202 intersects an inclusion compared to when the laser sheet 202 doesn't intersect an inclusion. For example, row 302 illustrates that, for an inclusion 310 on the top surface of a glass sheet 106, top surface scattering is stronger (e.g., greater) when the inclusion 310 is in the path of the laser sheet 202, compared to when the inclusion 310 is out of the path of the laser sheet 202. For example, a particle on the top surface of the glass sheet 106 will be brightest when the glass sheet 106 moves to a position where the particle is at an intersection between the laser sheet 202 and the glass sheet 106 top surface. Similarly, row 304 illustrates that, for an inclusion 312 embedded within the glass sheet 106, scattering is stronger when the inclusion 312 is in the path of the laser sheet 202, compared to when the inclusion 312 appears before or after the laser sheet 202. Row 306 illustrates that, for an inclusion 314 on the bottom surface of the glass sheet 106, bottom layer scattering is stronger when the inclusion 314 is in the path of the laser sheet 202, compared to when the inclusion 314 is outside of the path of the laser sheet 202.

Figure 4:
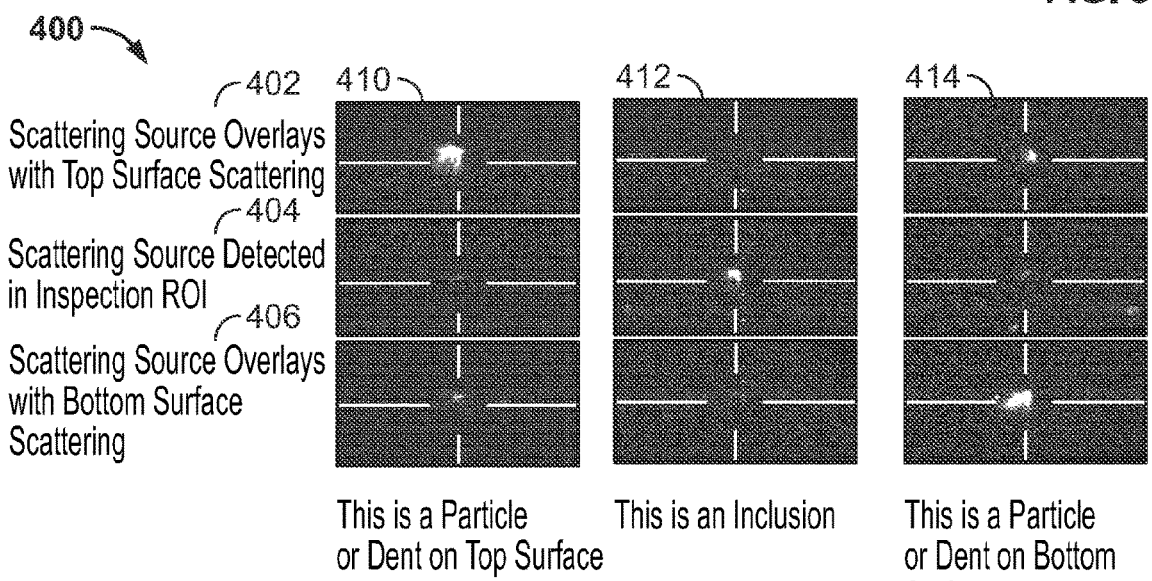
FIG. 4 illustrates images showing light scattering intensities corresponding to the light scattering caused by the inclusions of FIG. 3.

FIG. 4 illustrates, in each of columns 410, 412, 414, images of top surface scattering, of scattering in a region of interest (ROI), and of bottom surface scattering. The images of column 410 represent images captured by camera 104 when a particle or dent is located on the top surface of glass sheet 106. In the image of row 402, a bright area can be seen, illustrating top surface scattering caused by the top surface particle. In the image of row 404, very little, if any, scattering is exhibited. Similarly, in the image of row 406, little bottom surface scattering is exhibited. Because the intensity of the scattering in the ROI as illustrated in the row 404 image is not greater than the top surface scattering of row 402, a processing device executing the static model described above would determine that this is not an inclusion.

The images of column 412 represent images captured by camera 104 when an inclusion inside the glass is located in a ROI. In the images of rows 402 and 406, very little, if any, top surface scattering or bottom surface scattering, respectively, is exhibited. Row 404, however, illustrates a much brighter area in the ROI. Because the intensity of the scattering in the ROI as illustrated in the row 404 image is greater than both the top surface scattering illustrated in the image of row 402 and the bottom surface scattering illustrated in the image of row 406, a processing device executing the static model described above would determine that this is an inclusion.

The images of column 414 represent images captured by camera 104 when a particle or dent is located on the bottom surface of glass sheet 106. In the image of row 402, a slightly bright area can be seen, indicating some top surface scattering. In the image of row 404, very little, if any, scattering is exhibited. In the image of row 406, however, stronger bottom surface scattering is exhibited. Because the intensity of the scattering in the ROI as illustrated in the row 404 image is not greater than the bottom surface scattering illustrated in the image of row 406, a processing device executing the static model described above would determine that this is not an inclusion.

Figure 5:
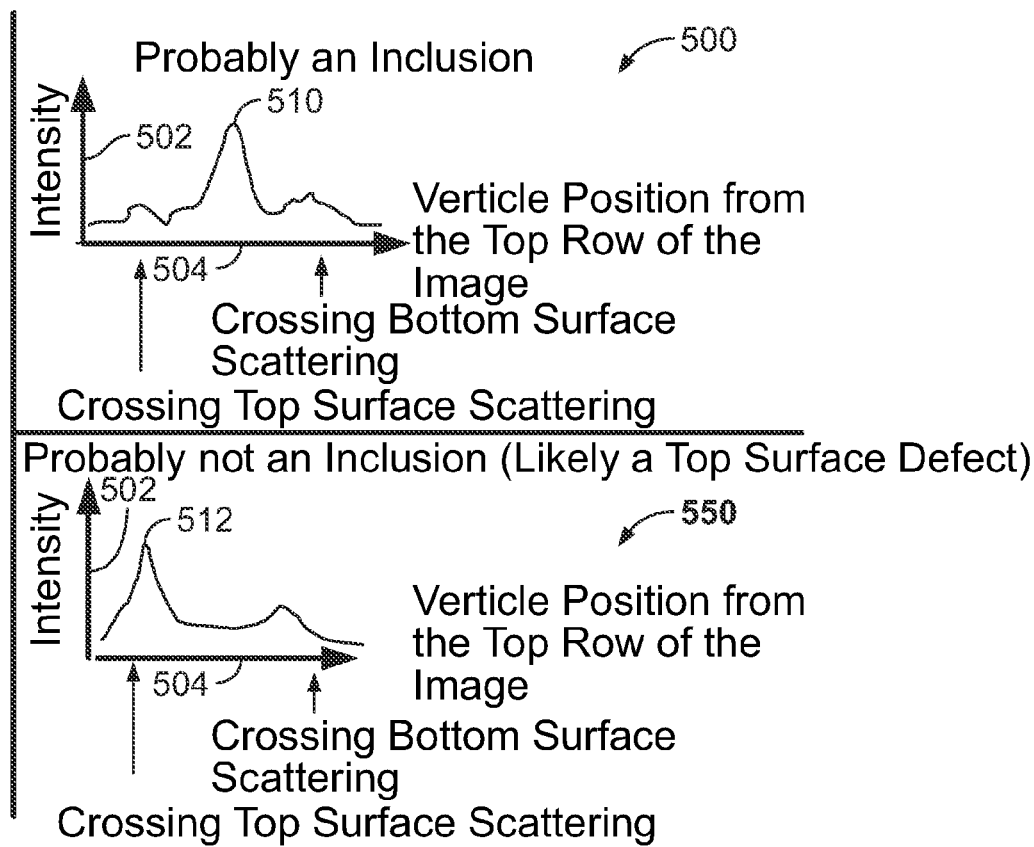
FIG. 5 illustrates a comparison of light intensity graphs when an inclusion is present and when surface texture is present in glass.

FIG. 5 illustrates a graph 500 and a graph 550. Each of graphs 500 and 550 include intensities along each vertical axis, and vertical positions (measured from the top row of each image) along each horizontal axis. Graph 500 illustrates an intensity plot when there is an inclusion, and graph 550 illustrates an intensity plot when there is surface defect (e.g., surface noise). For example, graph 500 illustrates a peak intensity 510, which is located at some point between top surface scattering and bottom surface scattering. Graph 550, however, illustrates a peak intensity 512 that is located with the top surfaced scattering. The intensities of graphs 500 and 550 can be represented with intensity trace arrays, described above with respect to the dynamic model.

Figure 6:
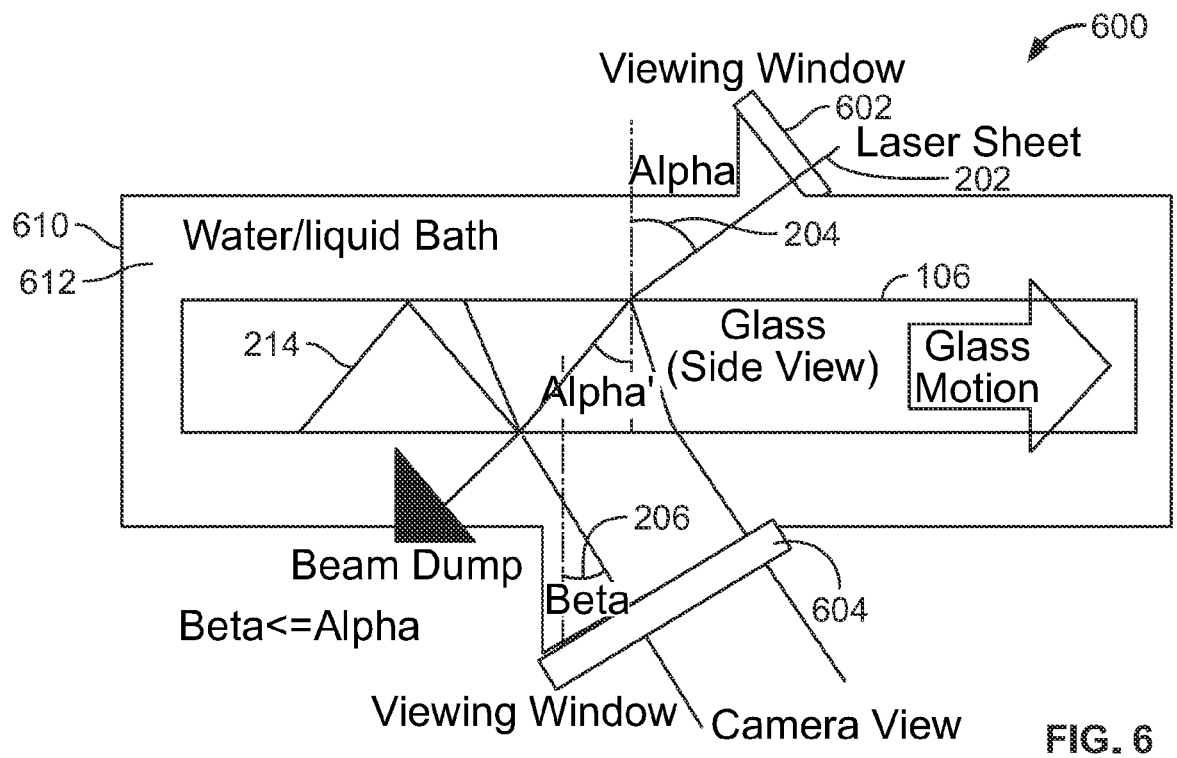
FIG. 6 is a block diagram of an exemplary glass inclusion detection apparatus with a water bath system that reduces surface scattering in accordance with some examples.

FIG. 6 illustrates a glass inclusion detection apparatus 600 that includes a liquid bath container 610 filled with liquid (e.g., water) 612. Glass sheet 106 is submerged in the liquid 162. For example, for glass with heavier texture, the liquid 612 can partially match the refraction index at glass surfaces to further reduce surface noise. Glass sheet 106 is moved inside liquid bath container 610 by motion stage 108 (not shown in this figure). Liquid bath container 610 has two transparent windows 602, 604, for laser sheet 202 illumination and camera 104 view. In addition to the surface scattering suppression, light rays bend less at the glass surfaces, therefore the glass surface scattering will be separated further apart and yield a wider inspection ROI. In this example, angle beta 206 is less than or equal to angle alpha 204.

Figure 7A:
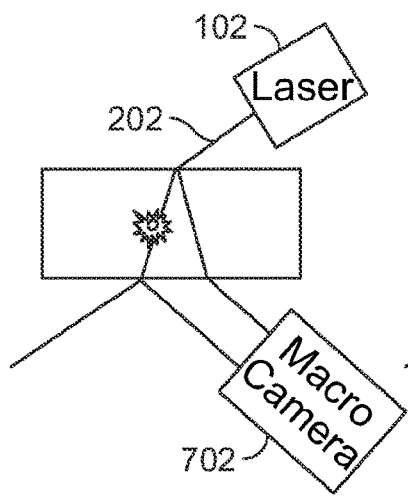
FIGS. 7A, 7B, and 7C are block diagrams of an exemplary glass inclusion detection apparatus that employs a laser dark field system to further evaluate suspicious areas detected on a first pass by a macro camera in accordance with some examples.
Figure 7B:
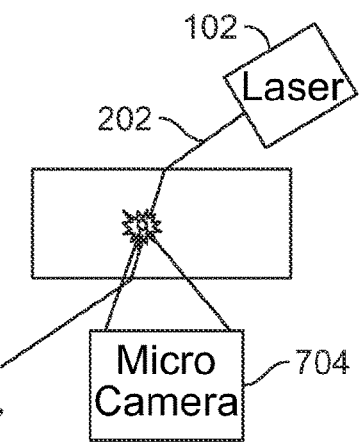
Figure 7C:
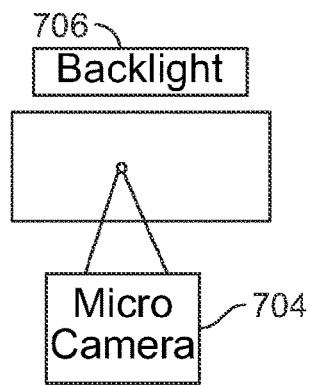

FIGS. 7A, 7B, and 7C illustrate an example of a microscope revisit apparatus and process. In FIG. 7A, glass sheet 106 is moved to a location where an inclusion was previously found, such that the inclusion is scattering laser sheet 202 in camera's 104 field of view. In FIG. 7B, a microscope 704 is focused (e.g., with a field of view) underneath the inclusion. Microscope 704 may have a relatively higher magnification than camera 104, and can be positioned at an angle to glass sheet 106 different than the angle of camera 104 to glass sheet 106. Microscope 704 can locate the inclusion based on the scattering of laser sheet 202 caused by the inclusion. Then, as shown in FIG. 7C, laser dark field microscopy is employed. Here, the laser 102 is turned off, and a brightfield backlight 706 is turned on. The brightfield backlight is on the same side of the glass sheet that the laser 102 was on. With the brightfield backlight on, the inclusion is easily located with microscope 704. The location of the inclusion can be marked, or recorded.

Figure 8:
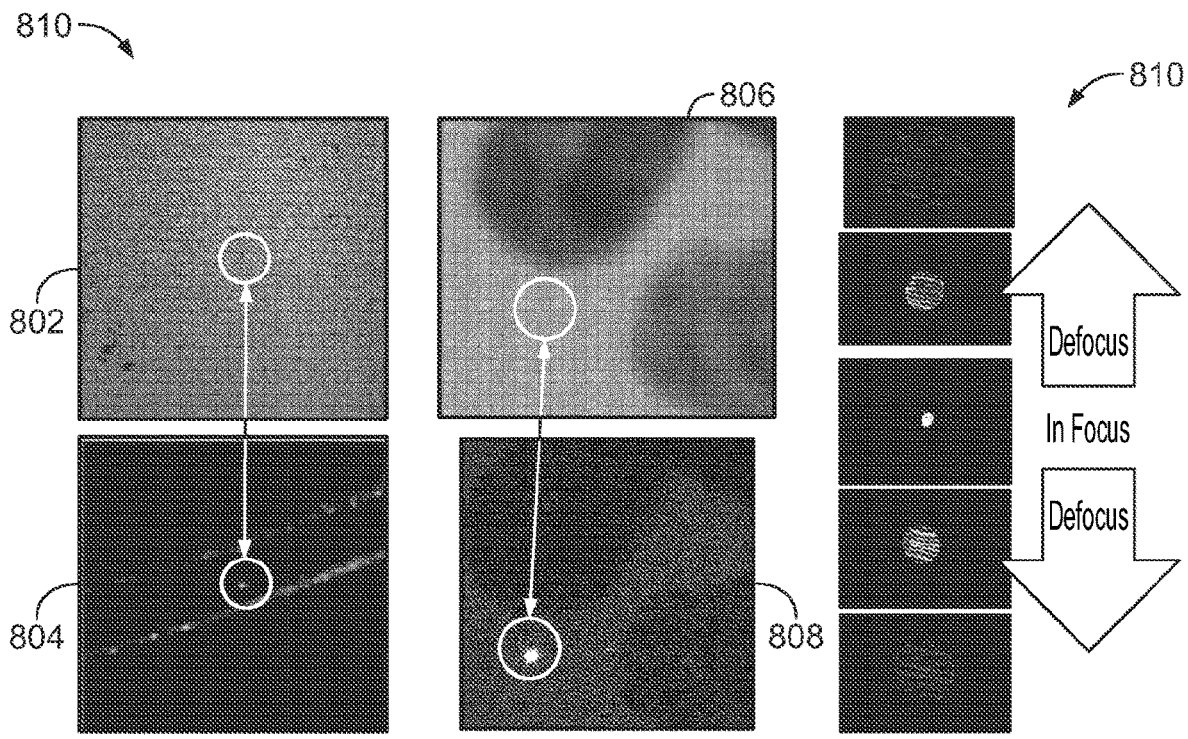
FIG. 8 illustrates images of inclusions as detected by the laser dark field system of FIG. 7 in accordance with some examples.

Image 802 in FIG. 8 illustrates a revisit without laser dark field. The inclusion in this image is more difficult to detect than with the assistance of laser dark field, as illustrated in image 804. Similarly, a small inclusion in image 806 is more difficult to detect without laser dark field. In image 808, with laser dark field, the same inclusion is easily detectable. With laser dark field, as illustrated in images 810, the microscope 704 can easily be focused onto the inclusion.

Figure 9:
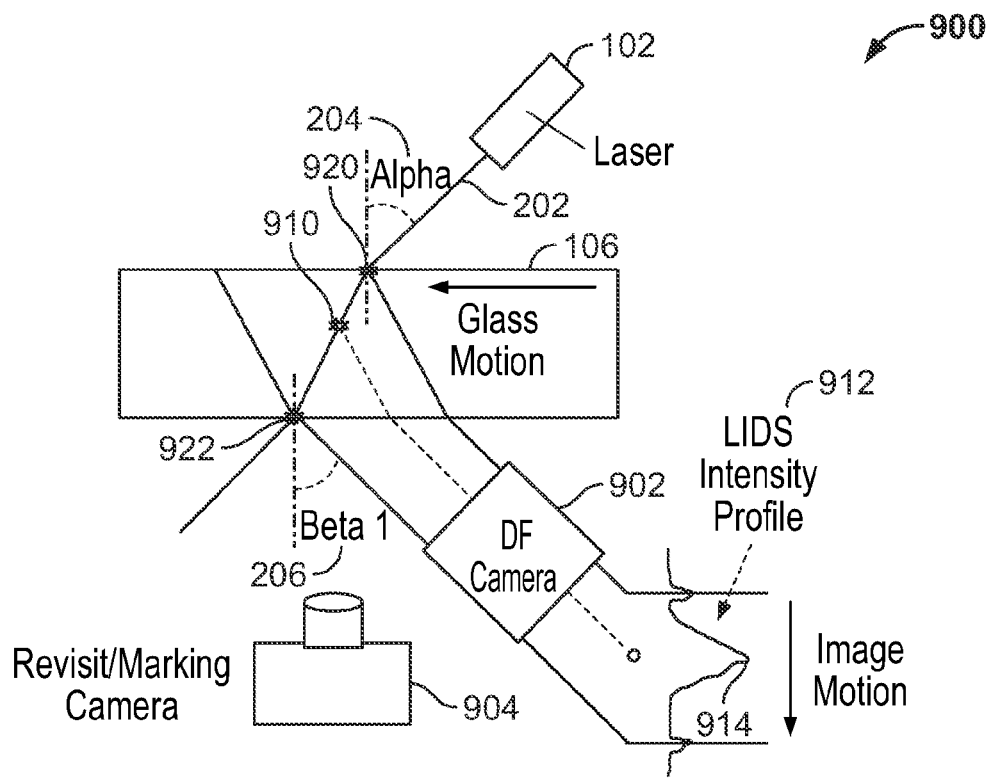
FIG. 9 is a block diagram of an exemplary glass inclusion detection system employing a darkfield camera and showing a light intensity profile as an inclusion crosses through a laser sheet in accordance with some examples.

FIG. 9 illustrates a glass inclusion detection system 900 that includes laser 102, darkfield camera 902, and revisit camera 904. Revisit camera 904 may be a higher resolution microscopic imaging camera to verify inclusions located with darkfield camera 902. As illustrated, glass sheet 106 is moved along a horizontal axis (by a motion stage, not shown in this figure). As inclusion 910 moves across laser sheet 202, it moves "down" the field of view of darkfield camera 902. When inclusion 910 intersects laser sheet 202, darkfield camera 902 captures an image with a (e.g., most intense) bright spot (e.g., an area of the image with a higher light intensity). For example, light intensity profile 912 illustrates that when inclusion 910 intersects laser sheet 202, a peak intensity 914 is captured in an image.

Figure 10A:
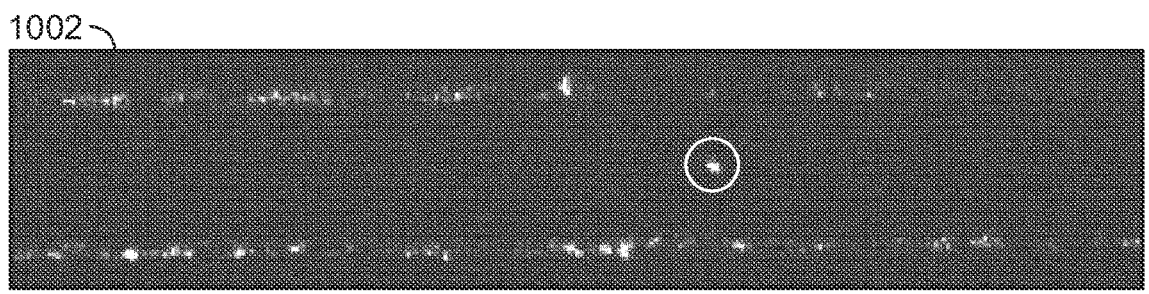
FIG. 10A illustrates an image of an inclusion in glass as captured by the exemplary glass inclusion detection apparatus of FIG. 9 in accordance with some examples.

For example, as illustrated in image 1002 of FIG. 10A, inclusion 910 may show in an image captured by darkfield camera 902 as indicated by the circled bright area.

Darkfield camera 902 may also capture images with bright areas due to top surface scattering caused by top surface defects 920 and bright areas due to bottom surface scattering cause by bottom surface defects 922.

Figure 10B:
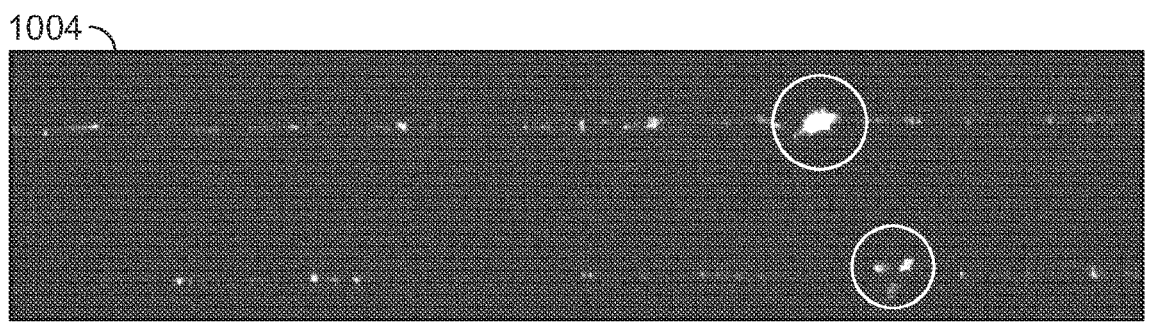
FIG. 10B illustrates an image of surface defects on glass as captured by the exemplary glass inclusion detection apparatus of FIG. 9 in accordance with some examples.

For example, as illustrated in image 1004 of FIG. 10B, a top surface defect may show in images captured by darkfield camera 902, such as the bright area indicated by the circled bright area located near the top of image 1004. Because of the top surface defects of glass sheet 104, a "top line" of bright areas can be seen (top surface scattering line). Similarly, a bottom surface defect may show in images captured by darkfield camera 902, such as the bright area indicated by the circled bright area located near the bottom of image 1004. Because of the bottom surface defects of glass sheet 104, a "bottom line" of bright areas can be seen (bottom surface scattering line).

Referring back to FIG. 10A, the circled bright area caused by inclusion 910 may be seen in a region of interest (ROI) between a top surface scattering line and a bottom surface scattering line. As such, inclusions may be discriminated from surface events.

Figure 11:
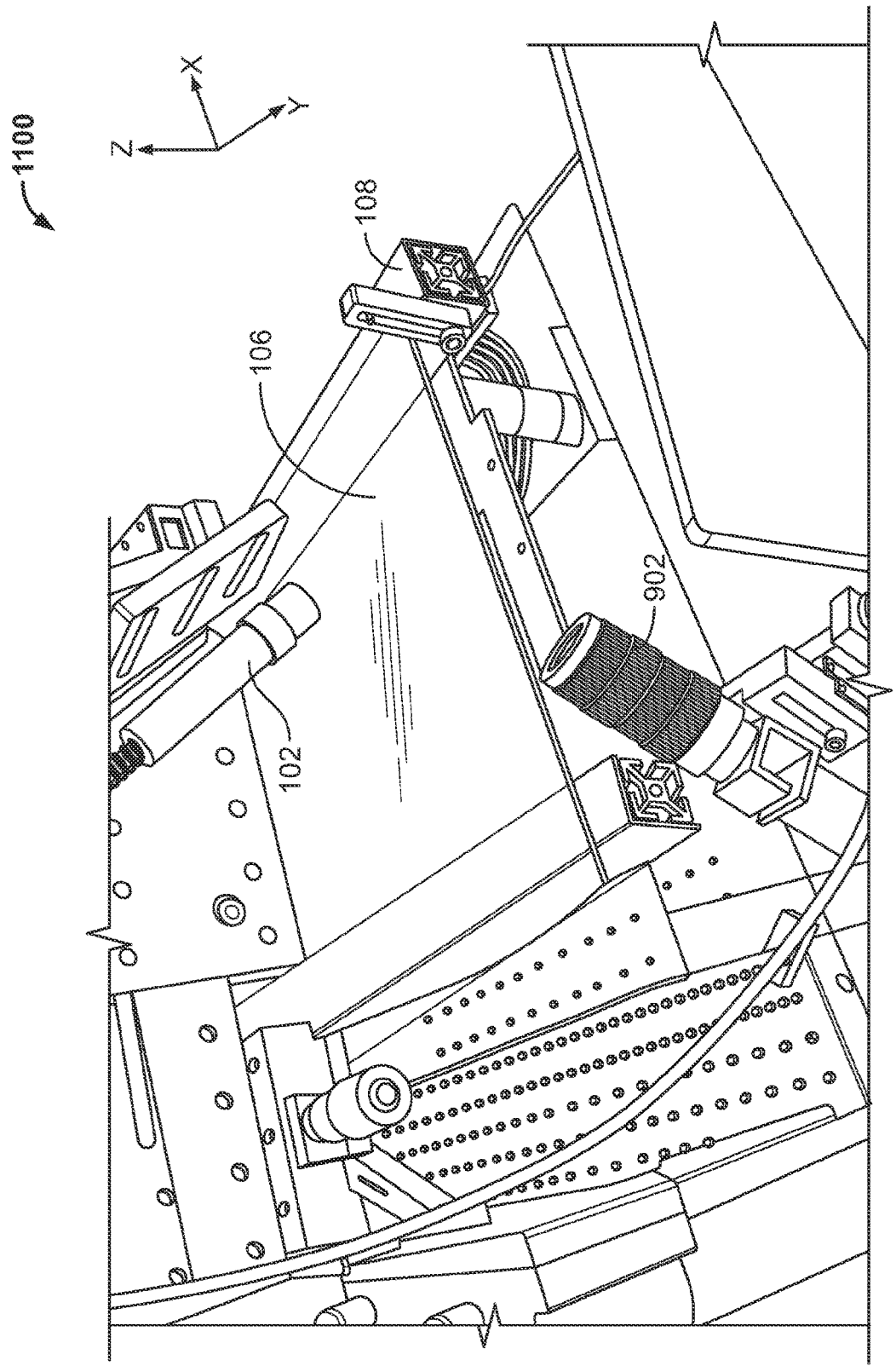
FIG. 11 is a block diagram of an exemplary glass inclusion detection apparatus employing a darkfield camera in accordance with some examples.

FIG. 11 illustrates a glass inclusion detection apparatus 1100 that includes darkfield camera 904, laser 102, motion stage 108, and glass sheet 106. Motion stage 108 can move glass sheet 106 to pass through and intersect a laser sheet projected by laser 102, as well as pass through a field of view of camera 902. For example, with laser 102 turned on and projecting a laser sheet onto a top side of glass sheet 106, motion stage 108 may move glass sheet 106 horizontally (e.g., in the X direction) by a predetermined distance (e.g., 26 μm). The predetermined distance may be less than (or equal to) a width of the laser sheet (e.g., width of laser sheet in X direction). This may ensure that the entire glass volume is scanned for inclusions since the inclusion, regardless of its position along the scan axis, would always intercept with a part of the laser line and cause a scatter signal. Darkfield camera 902 may be configured to then capture an image of glass sheet 106 from a bottom side of glass sheet 106. Motion stage 108 may then move glass sheet 106 again by the predetermined distance, and darkfield camera 902 may once again capture an image. This process can continue until images for the entire length of glass sheet 106 are captured.

In some examples, motion stage 108 may move glass sheet 106 in a sideways direction (e.g., in the Y direction), and the process described above may be repeated to capture images. For example, glass sheet 106 may be moved sideways by less than (or equal to) the length of the laser sheet (e.g., length of laser sheet in the Y direction). In this manner, images of the entire area of the glass sheet 106 (e.g., as defined by the length and width of the glass sheet 106) may be captured.

Figure 12A:
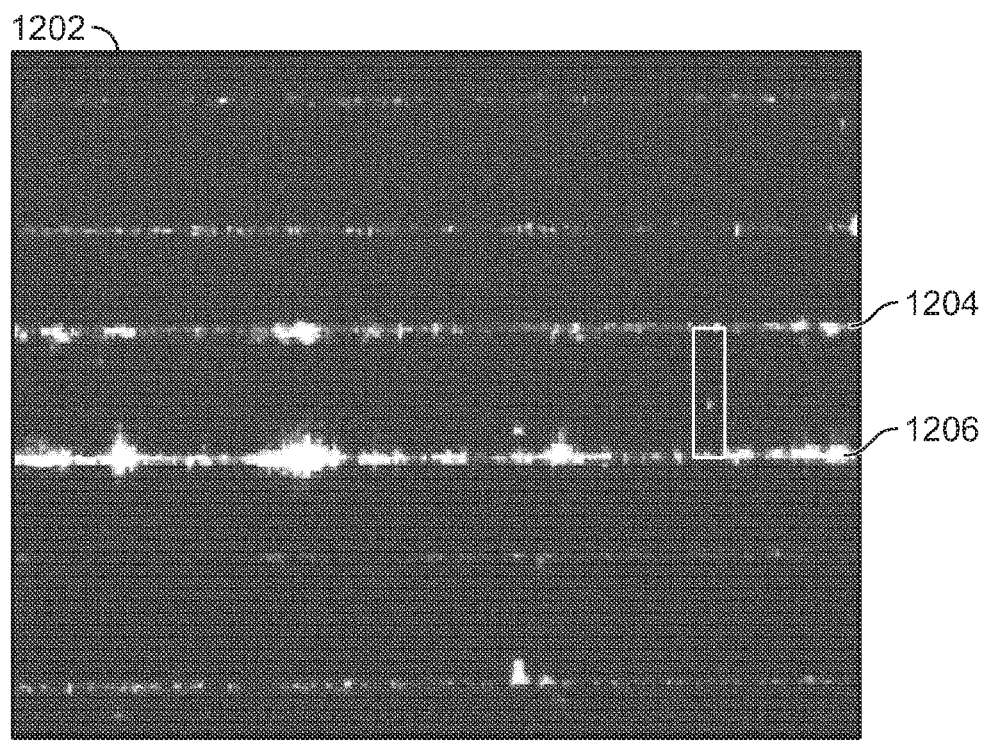
FIG. 12A illustrates a dynamic tracking image captured by the exemplary glass inclusion detection apparatus of FIG. 11 in accordance with some examples.

FIG. 12A illustrates an image 1202 that is composed of various frames. Image 1202 illustrates a bright area caused by inclusion and detected by a processing device, such as an image processing device, that processes images captured by darkfield camera 902. A box highlights the bright area caused by the inclusion. Image 1202 also illustrates other bright areas, such as top scattering line 1204 and bottom scattering line 1206. In this example, the processing device employed the dynamic model described above to identify the inclusion.

Figure 12B:
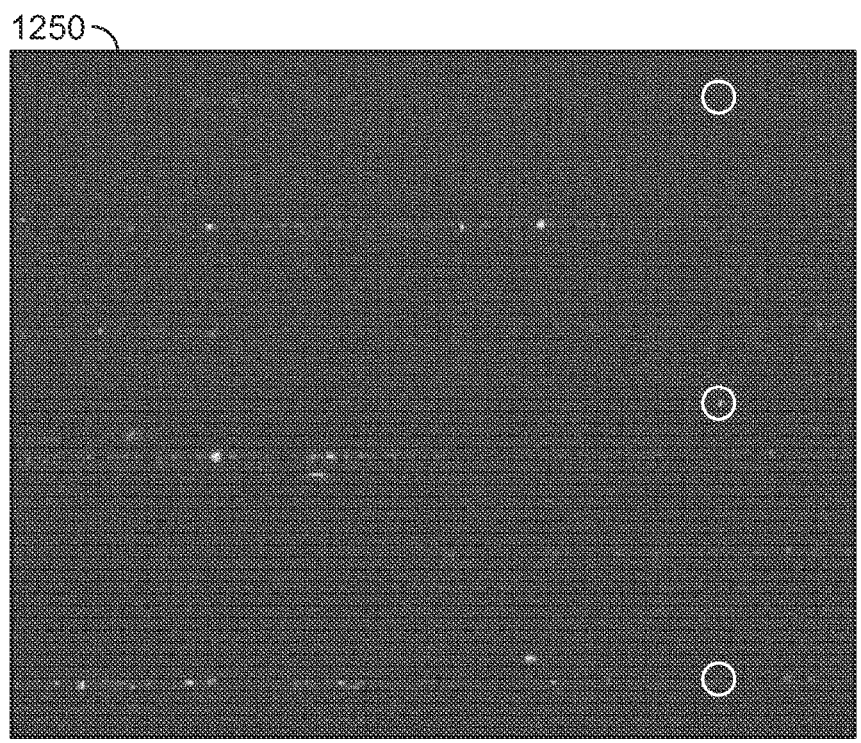
FIG. 12B illustrates a static tracking image captured by the exemplary glass inclusion detection apparatus of FIG. 11 in accordance with some examples.

FIG. 12B illustrates an image 1250 composed of various frames as well. In this example, the processing device detected an inclusion that is causing a bright area in the middle of the image, which is circled. In this example, the processing device executed the static model described above. Image 1250 also illustrates the brightness captured for the inclusion as it came into the field of view of darkfield camera 902 (as the glass sheet 106 was moved by the motion stage 108), as indicated by the top circle. Image 1254 further illustrates the brightness captured for the inclusion as it left the field of view of darkfield camera 902, as indicated by the bottom circle. As is illustrated, the area circled in the middle of image 1204 is brighter than the areas circled on the top and the bottom of image 1204. This is because the detected inclusion does not intersect the laser sheet until sometime after it comes into the field of view of darkfield camera 902, and leaves the area covered by the laser sheet sometime before it leaves the field of view of darkfield camera 902.

Figure 13:
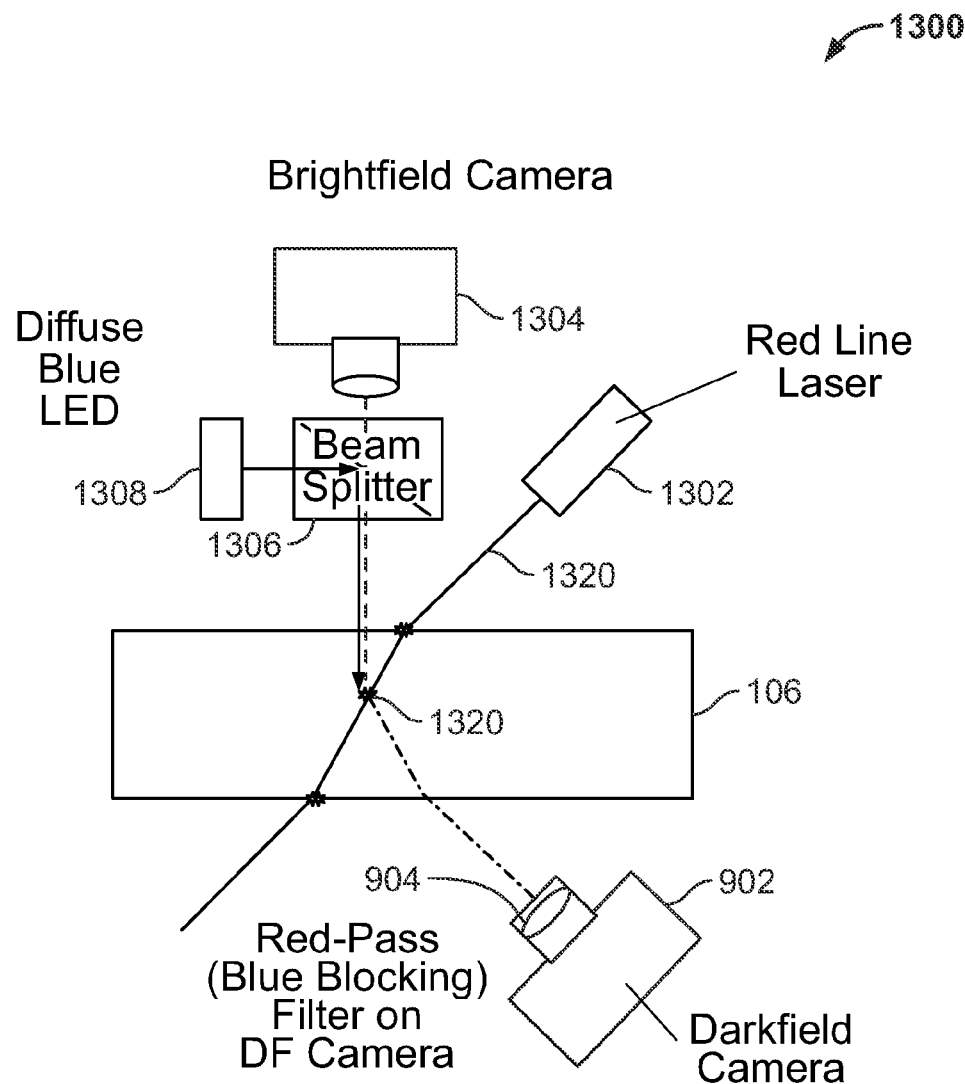
FIG. 13 is a block diagram of an exemplary glass inclusion detection apparatus employing a brightfield camera in accordance with some examples.

FIG. 13 illustrates a glass inclusion detection apparatus 1300 that includes a red line laser 1302, a darkfield camera 902, and a brightfield camera 1304. Red line laser 1302 can generate a red laser sheet 1320 that intersects glass sheet 106. Darkfield camera 902 includes a red-pass filter lens 904 which allows red light to pass. As such, darkfield camera 902 can capture scattering events caused by inclusions in glass sheet 106 intersecting red laser sheet 1320.

Brightfield camera 1304 can capture images using brightfield illumination. For example, brightfield camera 1304 can be a camera used in a brightfield imaging system where the illumination source is directly captured by the imaging system, either through direct illumination of source to camera (e.g., transmission brightfield), or specular reflection of source from an object (e.g., reflective brightfield) to the camera. In the case of transmission brightfield, light from the illumination source is transmitted through the object and the camera directly images the transmitted light through the object. In the case of reflective brightfield, the illumination source is used to illuminate an object, and the specular reflected light from the object is directly captured by the camera. Brightfield camera 1304 is employed to more reliably capture reflective metallic inclusions which may produce little or low scatter signal (e.g., due to laser sheet 202), as described further below. Brightfield camera 1304 is located on an opposite side of glass sheet 106 than darkfield camera 902. For example, brightfield camera 1304 is on the same side as red line laser 1302. In this example, reflective brightfield is employed. In other examples, by glass inclusion detection apparatus 1300 may employ transmission brightfield.

Glass inclusion detection apparatus 1300 also includes a beam splitter 1308 with a diffuse blue LED 1308. Diffuse blue LED 1308 acts as the light source for brightfield camera 1304. Beam splitter 1308 directs light from diffuse blue LED 1308 to glass sheet 106. Specifically, blue light from diffuse blue LED 1308 is directed, via beam splitter 1308, to the top surface of glass sheet 106 (e.g., at a normal angle to the top surface of glass sheet 106). The blue light can reflect off of glass sheet 106, and brightfield camera 1304 can capture the reflection of the blue light. Diffuse blue LED 1308 provides for a more uniform reflection signal from a textured glass surface of glass sheet 106. Highly reflective localized features, such as metallic crystals, provide a significantly higher reflective signal than the top surface of glass sheet 106. Because darkfield camera 902 includes red-pass filter lens 904, blue light from diffuse blue LED 1308 is blocked, and is not seen by darkfield camera 902. This allows for scanning with brightfield camera 1304 and darkfield camera 902 simultaneously.

In some examples, darkfield camera 902 and brightfield camera 1304 are used simultaneously to differentiate reflective events as surface defects or inclusions. For example, images captured by brightfield camera 1304 can be used to identify and track reflective events that appear between laser lines of red laser sheet 1320. The reflection signal (e.g., from diffuse blue LED 1308) as captured by brightfield camera 1304 is tracked as it approaches and goes through both the top surface and bottom surface intercepts of red laser sheet 1320 with glass sheet 106. If the reflection signal is reflecting from a metallic inclusion, the reflection signal will not significantly change at these intercept points. For example, the reflection signal will not be significantly brighter than a reflection signal reflected from an adjacent laser line surface signal. If the reflection signal is instead reflecting from a surface particle (e.g., a top or bottom surface defect of glass sheet 106), the reflection signal will get significantly stronger at the top or bottom surface laser intercept point depending on which surface of glass sheet 106 the particle is located. For example, the reflection signal will get significantly stronger at the top surface laser intercept point if the particle is located on a top surface of glass sheet 106, and will get significantly stronger at the bottom surface laser intercept point if the particle is located on a bottom surface of glass sheet 106.

Figure 14A:
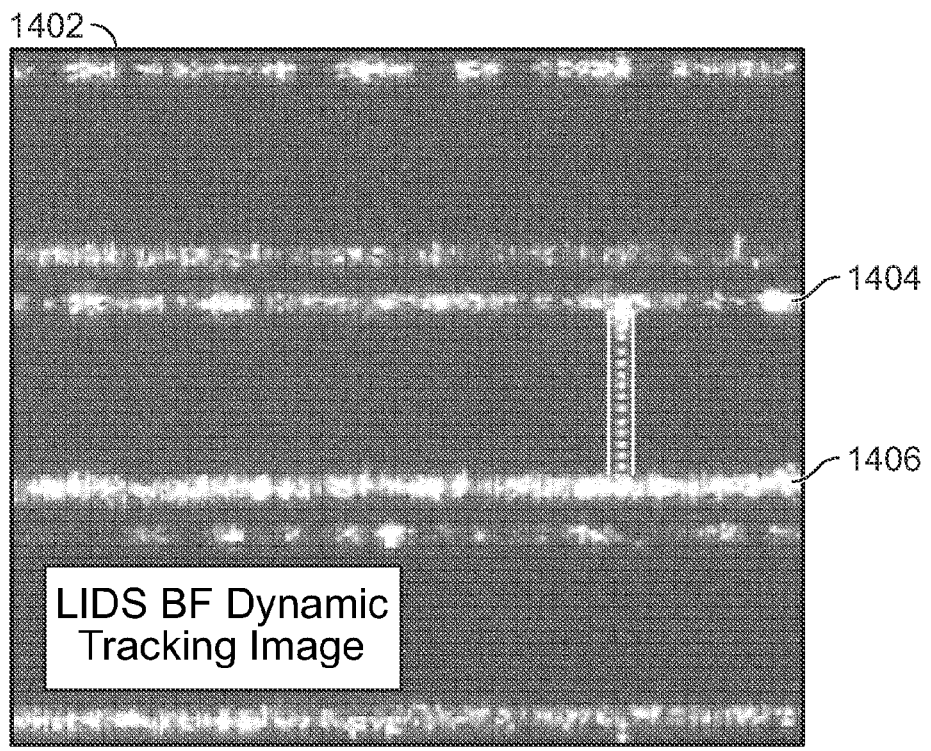
FIG. 14A illustrates a dynamic tracking image captured by the exemplary glass inclusion detection apparatus of FIG. 13 in accordance with some examples.

FIG. 14A illustrates an image 1402 that is composed of various frames captured by brightfield camera 1304. Image 1404 illustrates a bright area, outlined in a box, caused by a metallic inclusion reflecting light from diffuse blue LED 1308. As illustrated, because the signal is reflecting from a metallic inclusion, the reflection signal does not significantly change between the top surface scattering line 1404 and the bottom surface scattering line 1406. In this example, a processing device detected the metallic inclusion by executing the dynamic model described above.

Figure 14B:
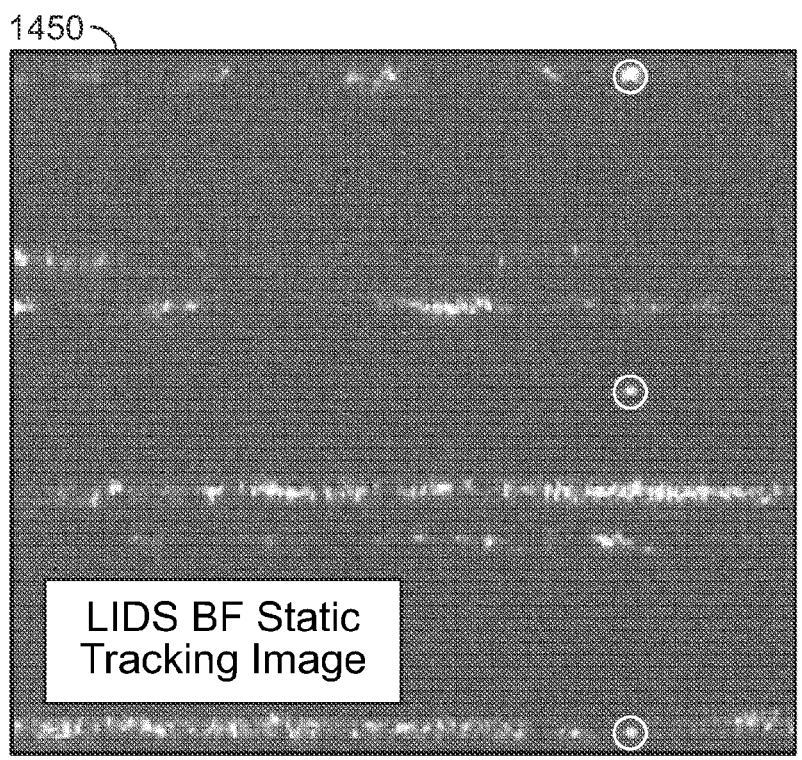
FIG. 14B illustrates a static tracking image captured by the exemplary glass inclusion detection apparatus of FIG. 13 in accordance with some examples.

FIG. 14B illustrates an image 1450 composed of various frames and also captured by brightfield camera 1304. In this example, the processing device detected an inclusion that is causing a bright area in the middle of the image, which is circled. Image 1450 also illustrates the brightness captured for the inclusion as it came into the field of view of darkfield camera 902 (as the glass sheet 106 was moved by the motion stage 108), as indicated by the top circle. Image 1450 also illustrates the brightness captured for the inclusion as it left the field of view of darkfield camera 902, as indicated by the bottom circle. In this example, a processing device detected the metallic inclusion by executing the static model described above.

Figure 15:
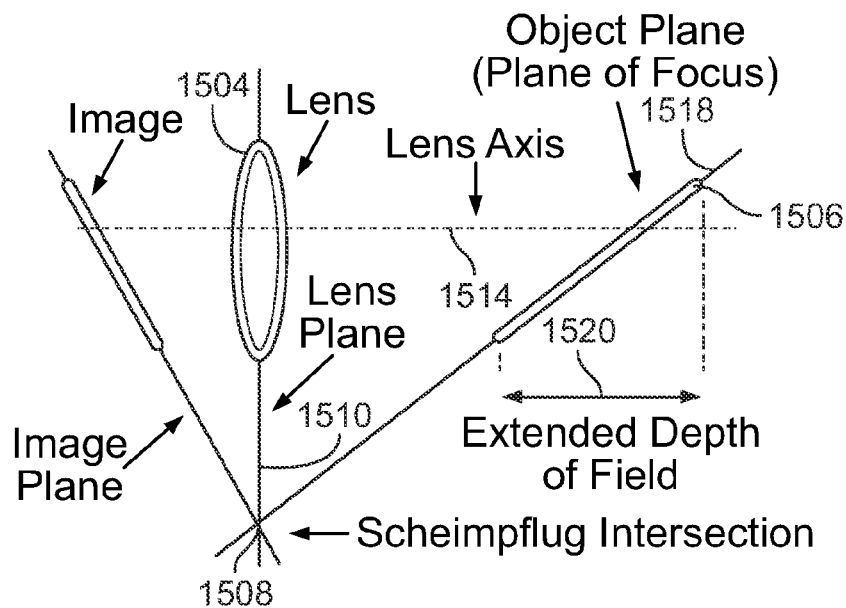
FIG. 15 illustrates the use the Scheimpflug principle in a camera system in accordance with some examples.

FIG. 15 illustrates the use the Scheimpflug principle in a camera system. An image 1502 of an object 1506 is captured through lens 1504. Image 1502 appears along an image plane 1512, and object 1506 lies along an object plane 1518. Lens 1504 lies along a lens plane 1510, and has a lens axis 1514. Image plane 1512, lens plane 1510, and object plane 1518 intersect at Scheimpflug intersection 1508. As illustrated, image plane 1512 and lens plane 1510 are not parallel to each other. In addition, object plane 1518 is not normal to lens axis 1514. As a result, an extended depth of field 1520 of object 1506 can be achieved.

Figure 16:
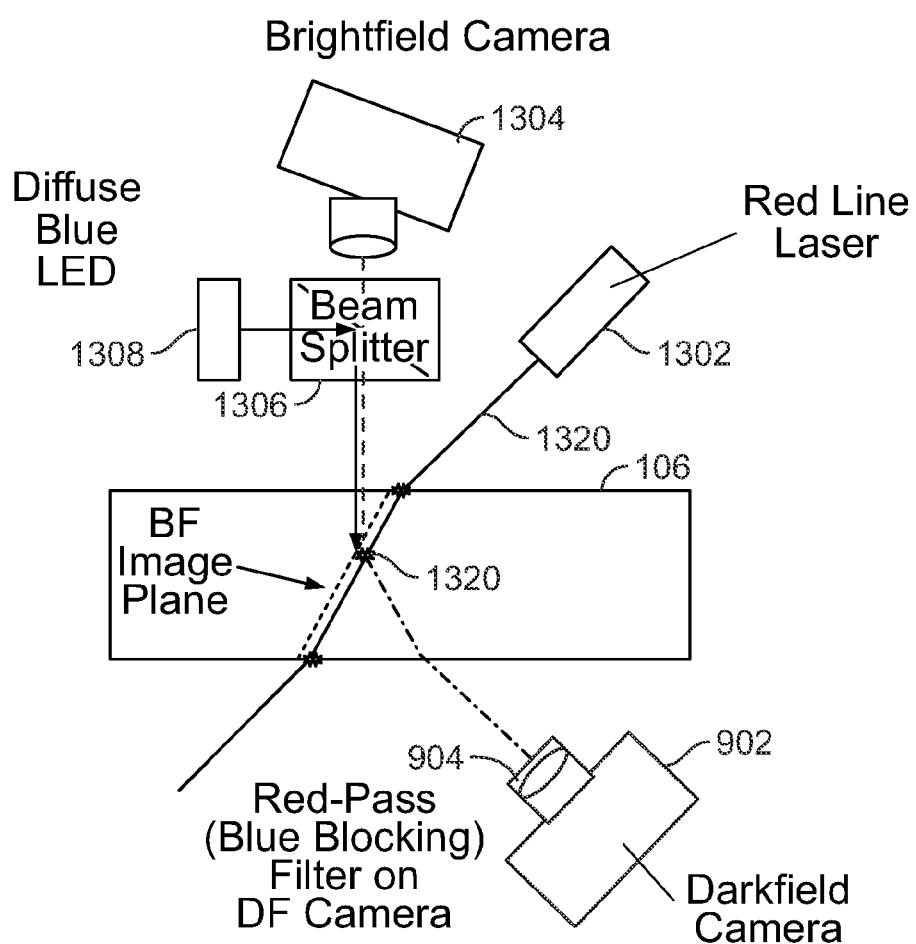
FIG. 16 is a block diagram of an exemplary glass inclusion detection apparatus employing a brightfield camera setup according to the Scheimpflug principle to achieve an extended depth of field in accordance with some examples.

FIG. 16 illustrates a glass inclusion detection apparatus 1600 that is similar to glass inclusion detection apparatus 1300 but takes advantage of the Scheimpflug principle. As a result, glass inclusion detection apparatus 1600 can provide a greater depth of field when capturing images with brightfield camera 1304 compared to glass inclusion detection apparatus 1300. In this example, an image plane of brightfield camera 1304 is angled (e.g., tilted) in the direction of red laser sheet 1320 such that the top surface laser line of red laser sheet 1320 (provided by red line laser 1302) is at one end of the image plane and the bottom surface laser line of red laser sheet 1320 is at another end of the image plane. As glass sheet 106 is scanned with brightfield camera 1304, a metallic defect will reflect light from diffuse blue LED 1308 and be received by brightfield camera 1304 through this tilted image plane. When the metallic defect intersects with the image plane of brightfield camera 1304, the metallic defect will be in sharp focus.

Figure 17:
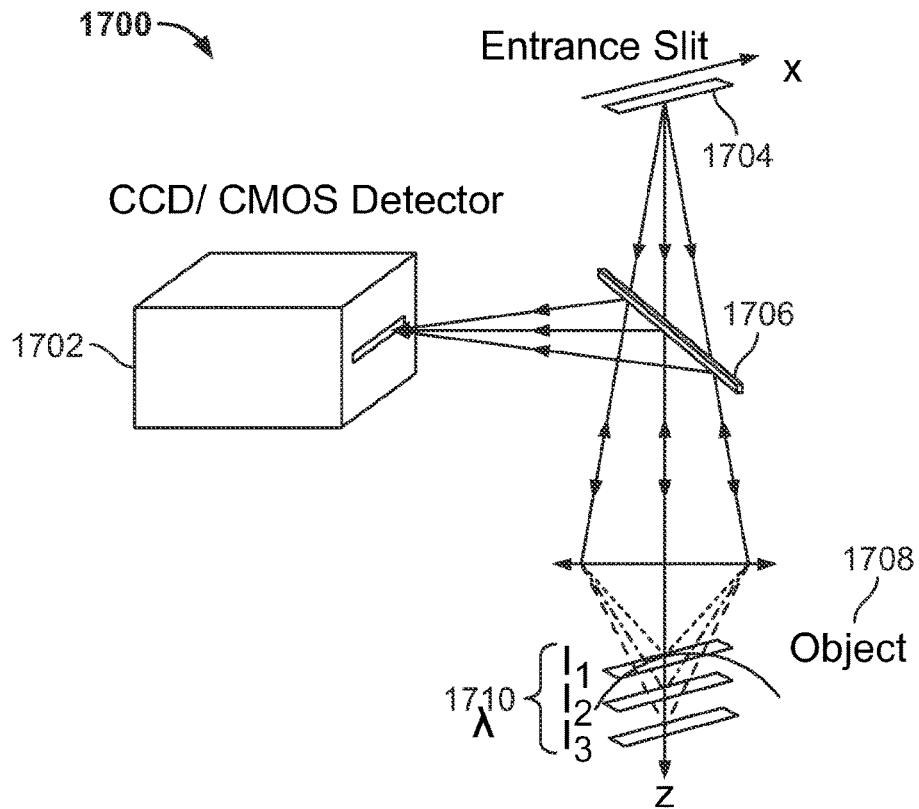
FIG. 17 is a block diagram of a chromatic confocal imaging system that can be combined with any of the glass inclusion detection apparatus to simultaneously scan glass for inclusions in accordance with some examples.

FIG. 17 illustrates a chromatic confocal imaging system 1700 that can be combined with any of the glass inclusion detection apparatus described herein to simultaneously scan glass for inclusions. Chromatic confocal imaging system 1700 includes a charge-coupled device (CCD) and/or complementary metal-oxide semiconductor (CMOS) detector 1702 that can capture images of object 1708 over a large depth of field 1710. A light source (not shown) provides light via slit 1704, and a beam splitter 1706 directs the light to object 1708. The light reflects from object 1708 back to beam splitter 1706 and is provided to CCD/CMOS detector 1702. The images captured by CCD/CMOS detector 1702 can be stored in memory, for example, and may be processed by a processing device.

In some examples, the chromatic confocal imaging system 1700 can be employed along with glass inclusion detection apparatus 100 to verify suspected inclusions. For example, glass inclusion detection apparatus 100 may identify glass sheet 106 areas with suspected inclusions, and chromatic confocal imaging system 1700 can be used to go back to those areas to verify whether the findings are in fact inclusions.

Figure 18:
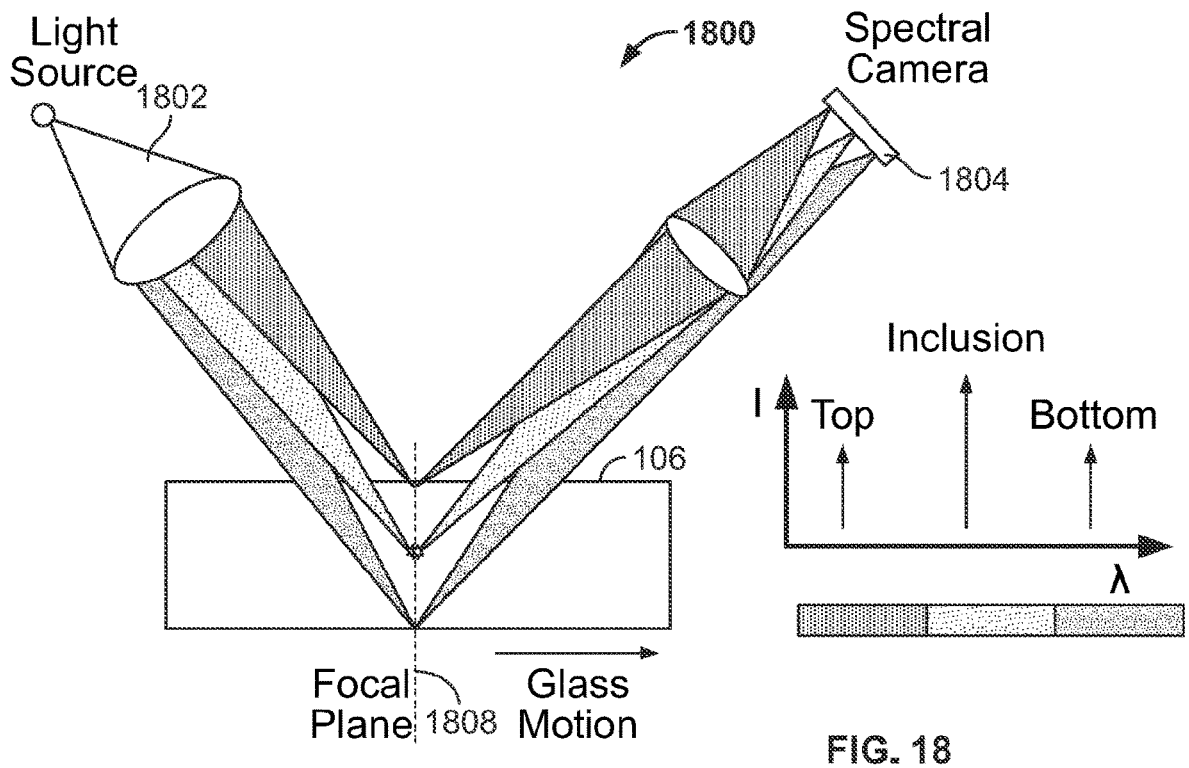
FIG. 18 is a block diagram of a chromatic confocal sensor with surface and height depth measurement capability that can be combined with any of the glass inclusion detection apparatus to simultaneously scan glass for inclusions in accordance with some examples.

FIG. 18 illustrates a chromatic confocal imaging system 1800 that includes depth measurement. In this example, a light source 1802 provides light to glass sheet 106. The light is provided at varying intensities, as indicated in the figure, to reach various depths of glass sheet 106. The light reflects from glass sheet 106 and is captured by spectral camera 1804. Based on the wavelength of the light captured, a depth of an inclusion can be determined. For example, graph 1810 shows captured light intensities from a top surface of glass sheet 106, from an inclusion in a regions of interest (ROI) of glass sheet 106, and from a bottom surface of glass sheet 106.

Figure 19:
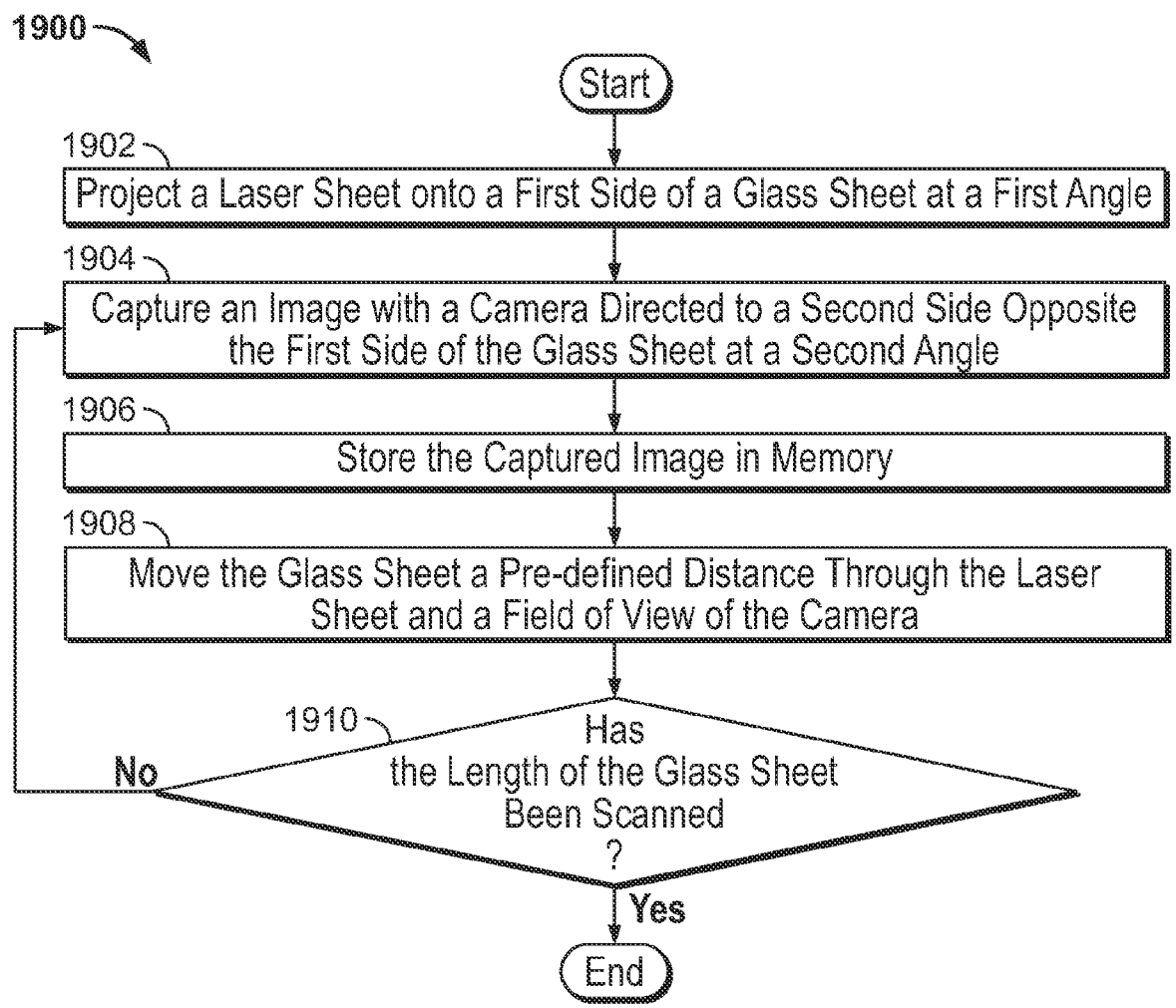
FIG. 19 illustrates an exemplary method that may be carried out by a glass inclusion detection apparatus in accordance with some examples.

In some examples, the chromatic confocal imaging system 1800 can be employed along with glass inclusion detection apparatus 100 to verify suspected inclusions. For example, glass inclusion detection apparatus 100 may identify glass sheet 106 areas with suspected inclusions, and chromatic confocal imaging system 1800 can be used to go back to those areas to verify whether the findings are in fact inclusions FIG. 19 illustrates an exemplary method 1900 that may be performed by a glass inclusion detection apparatus as described herein, such as glass inclusion detection apparatus 100. Beginning at step 1902, a laser sheet is projected onto a first side of a glass sheet at a first angle. At step 1904, an image is captured by a camera directed to a second side of the glass sheet at a second angle. The second side of the glass sheet is opposite the first side of the glass sheet. In some examples, the first angle is greater than or equal to the second angle. At step 1906, the captured image is stored in memory.

Proceeding to step 1908, the glass sheet is moved a predefined distance through the laser sheet and the field of view of the camera. For example, a motion stage 108 may move the glass sheet 106 a distance that is less than (or equal to) the width of laser sheet 202. At step 1910, a determination is made as to whether the length of the glass sheet has been scanned. If the length of the glass sheet has not yet been scanned, the method proceeds back to step 1904, where another image of the glass sheet is captured. Otherwise, if the length of the glass sheet has been scanned, the method ends.

Figure 20:
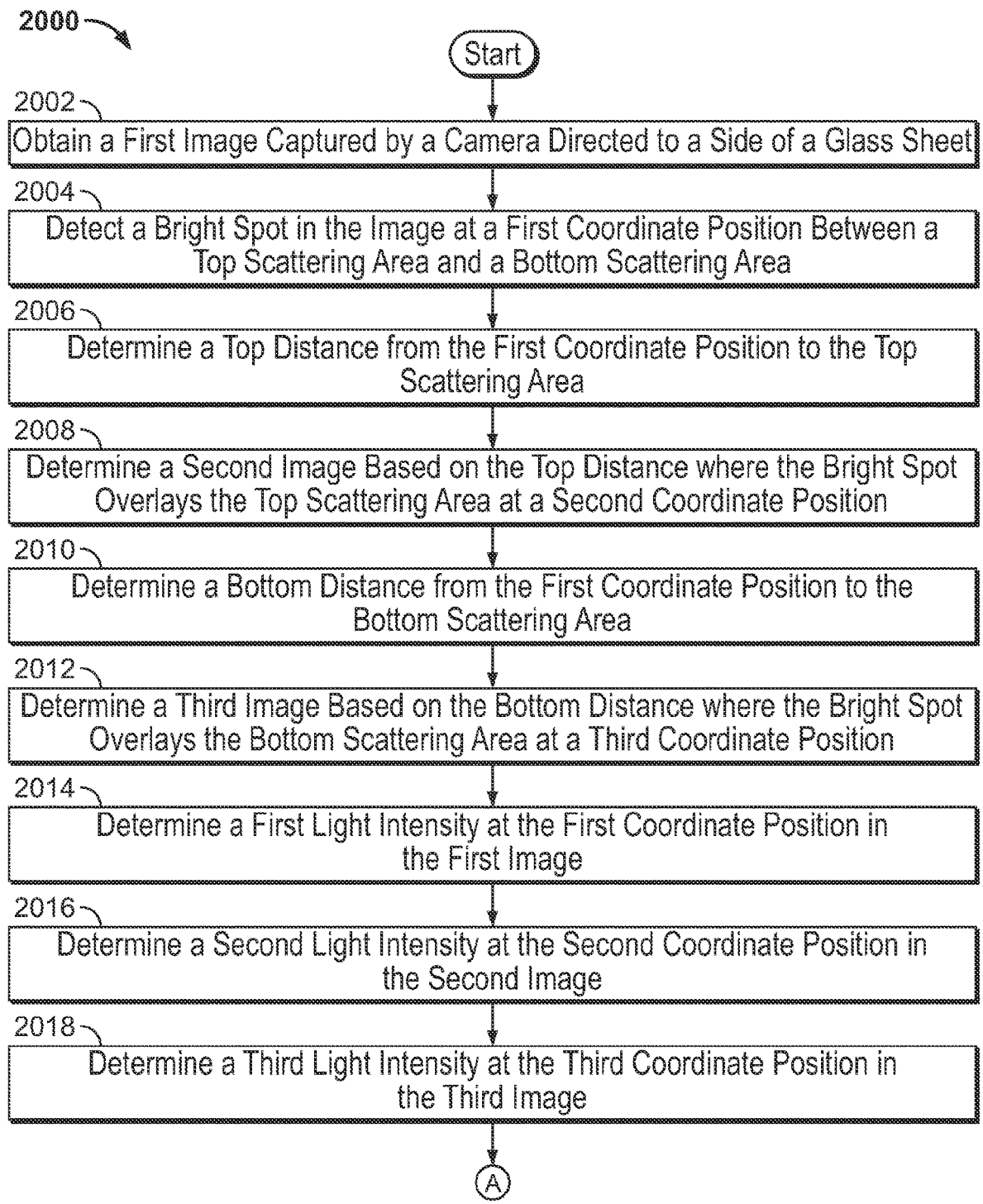
FIG. 20 illustrates another exemplary method that may be carried out by a glass inclusion detection apparatus in accordance with some examples.
Figure 20:
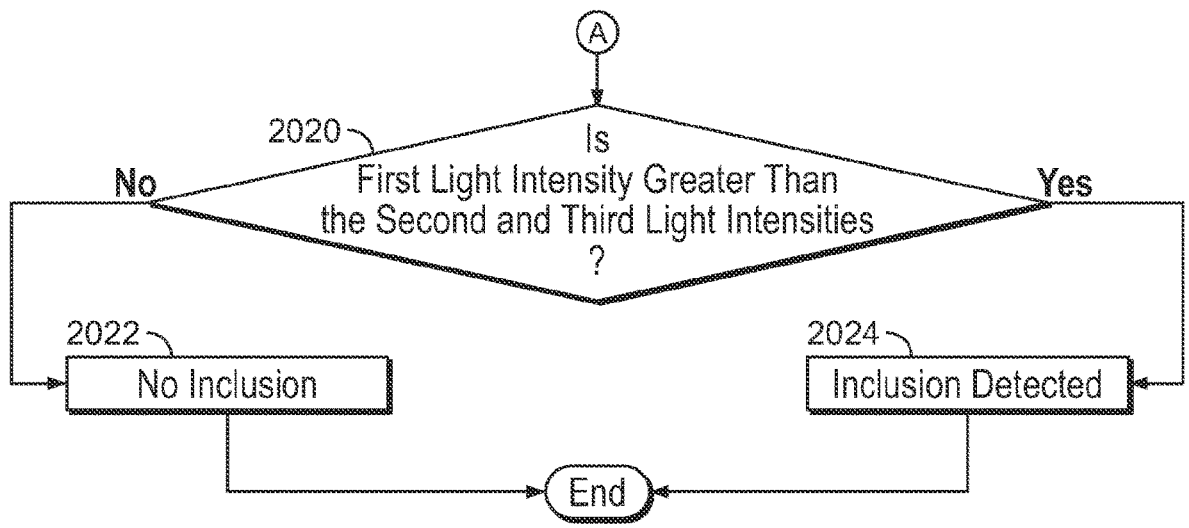

FIG. 20 illustrates an exemplary method 2000 that may be performed by one or more computing devices, such as a processing device as described herein. Beginning at step 2002, a first image captured by a camera directed to a side of a glass sheet is obtained. For example, the processing device may obtain the first image from a database. At step 2004, a bright spot is detected in the image at a first coordinate position between a top scattering area and a bottom scattering area. At step 2006, a top distance from the first coordinate position to the top scattering area is determined. At step 2008, a second image is determined based on the top distance. The second image is one where the bright spot is expected to overlay the top scattering area at a second coordinate position.

Proceeding to step 2010, a bottom distance from the first coordinate position to the bottom scattering area is determined. At step 2012, a third image is determined based on the bottom distance. The third image is one where the bright spot is expected to overlay the bottom scattering area at a third coordinate position.

At step 2014, a first light intensity is determined at the first coordinate position in the first image. At step 2016, a second light intensity is determined at the second coordinate position in the second image. At step 2018, a third light intensity is determined at the third coordinate position in the third image.

Proceeding to step 2020, a determination is made as to whether the first light intensity is greater than the second and third light intensities. If the first light intensity is not greater than the second and third light intensities, the method proceeds to step 2022, where an inclusion is not identified. For example, no inclusion is suspected at the first coordinate of the first image. If, however, the first light intensity is greater than the second and third light intensities, the method proceeds to step 2024, where an inclusion is identified. For example, an inclusion is suspected at the first coordinate of the first image. The method then ends.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of this disclosure. Modifications and adaptations to these embodiments will be apparent to those skilled in the art and may be made without departing from the scope or spirit of this disclosure.

What is claimed is:

1. An apparatus comprising:
   a laser configured to project a laser sheet onto a first side of a glass sheet;
   a first camera configured to capture first images of the glass sheet from a second side of the glass sheet, wherein the first camera captures the first images using darkfield illumination; and
   at least one processor configured to determine areas of relatively higher light intensities in the captured first images, wherein determining areas of relatively higher light intensities in the captured first images comprises:
      identifying, in a first image, a top line of higher light intensity;
      identifying, in the first image, a bottom light of higher light intensity;
      identifying, in the first image, a first area of higher light intensity between the top line of higher light intensity and the bottom line of higher light intensity;
      determining a first distance from the first area to the top line;
      determining a second area in a second image based on the first distance, where the first area overlays the top line of higher light intensity in the second image; and
      determining that a first light intensity of the first area in the first image is greater than a second light intensity of the second area in the second image determining an inclusion in the first area based on light intensities of the top line, the bottom line, and the first area.

2. The apparatus of claim 1 further comprising a motion stage configured to move the glass sheet thorough the laser sheet.

3. The apparatus of claim 1, wherein the at least one processor is configured to identify inclusions in the glass sheet based on the areas of relatively higher light intensities in the captured first images.

4. The apparatus of claim 1, wherein determining areas of relatively higher light intensities in the captured first images further comprises:
  determining a second distance from the first area to the bottom line;
  determining a third area in a third image based on the second distance, where the first area overlays the bottom line of higher light intensity in the third image; and
  determining that the first light intensity of the first area in the first image is greater than a third light intensity of the third area in the third image.

5. The apparatus of claim 1, wherein determining areas of relatively higher light intensities in the captured first images further comprises:
  determining, for each of a first plurality of images of the captured first images, a first expected location of the first area in each image based on the first distance;
  determining a second distance from the first area to the bottom line;
  determining, for each of a second plurality of images of the captured first images, a second expected location of the first area in each image based on the second distance;
  determining a light intensity at each first expected location and at each second expected location;
  executing a machine learning algorithm to classify the light intensities; and
  determining the inclusion in the first area based on the classified light intensities.

6. The apparatus of claim 1 comprising a microscopic imaging camera configured to view the glass sheet from the second side of the glass sheet.

7. The apparatus of claim 1 comprising a second camera configured to capture second images of the glass sheet from the first side of the glass sheet, wherein the second camera captures the second images using brightfield illumination.

8. The apparatus of claim 7 comprising a diffuse blue light emitting diode configured to provide light to the first side of the glass sheet, and wherein the first camera comprises a blue light blocking filter.

9. The apparatus of claim 8, wherein the laser is a red line laser.

10. The apparatus of claim 8, wherein the first camera and the second camera are configured to capture the first images and the second images, respectively, simultaneously.

11. The apparatus of claim 1 comprising a chromatic confocal sensor configured to capture second images of reflective events off of the glass sheet from the first side of the glass sheet.

12. A method comprising:
  capturing images of a glass sheet;
  identifying, in a first image of the captured images, a top line of higher light intensity;
  identifying, in the first image, a bottom light of higher light intensity;
  identifying, in the first image, a first area of higher light intensity between the top line of higher light intensity and the bottom line of higher light intensity;
  determining a first distance from the first area to the top line;
  determining a second area in a second image of the captured images based on the first distance, where the first area overlays the top line of higher light intensity in the second image; and
  determining that a first light intensity of the first area in the first image is greater than a second light intensity of the second area in the second image, and
  determining an inclusion in the first area based on light intensities of the top line, the bottom line, and the first area.

13. The method of claim 12, further comprising:
  determining a second distance from the first area to the bottom line;
  determining a third area in a third image based on the second distance, where the first area overlays the bottom line of higher light intensity in the third image; and
  determining that the first light intensity of the first area in the first image is greater than a third light intensity of the third area in the third image.

14. The method of claim 12 further comprising:
  determining, for each of a first plurality of images of the captured images, a first expected location of the first area in each image based on the first distance;
  determining a second distance from the first area to the bottom line;
  determining, for each of a second plurality of images of the captured images, a second expected location of the first area in each image based on the second distance;
  determining a light intensity at each first expected location and at each second expected location;
  executing a machine learning algorithm to classify the light intensities; and
  determining the inclusion in the first area based on the classified light intensities.

* * * * *

UNITED STATES PATENT AND TRADEMARK OFFICE
CERTIFICATE OF CORRECTION

Page 1 of 1

PATENT NO. : 12,152,999 B2
APPLICATION NO. : 17/783315
DATED : November 26, 2024
INVENTOR(S) : Chaudhury et al.

It is certified that error appears in the above-identified patent and that said Letters Patent is hereby corrected as shown below:

On the Title Page

In the Abstract, Column 2, Line 6, delete "thorough" and insert -- through --.

In the Claims

In Claim 2, Column 21, Line 5, delete "thorough" and insert -- through --.

Signed and Sealed this
Tenth Day of February, 2026

John A. Squires
*Director of the United States Patent and Trademark Office*